United States Patent Office 3,586,496
Patented June 22, 1971

3,586,496
HERBICIDAL COMPOSITIONS AND USE OF N-(CYCLOALKEN - 1 - YL-) ALPHA-HALO-ACETAMIDES
John P. Chupp, Kirkwood, Mo., assignor to Monsanto Company, St. Louis, Mo.
No Drawing. Continuation-in-part of application Ser. No. 523,870, Feb. 1, 1966. This application Sept. 15, 1969, Ser. No. 858,140
Int. Cl. A01n 9/20, 9/02
U.S. Cl. 71—118
29 Claims

ABSTRACT OF THE DISCLOSURE

Herbicidal compositions and method of use utilizing N-(cycloalken-1-yl)-alpha-haloacetamides.

This application is a continuation-in-part of copending application Ser. No. 523,870, filed Feb. 1, 1966 now abandoned.

This invention relates to herbicidal compositions comprising N-(cycloalken-1-yl)-alpha-haloacetamide. This invention further relates to inhibiting the growth of plants utilizing one or more N-(cycloalken-1-yl)-alpha-haloacetamide.

The term "plant" as used herein and in the appended claims means terrestrial plants and aquatic plants.

The term "terrestrial plant" is inclusive of dormant seeds, germinant seeds, germinative seeds, emerging seedlings and established woody and herbaceous vegetation including the roots and above-ground portions.

The term "aquatic plant" means algae and higher aquatic plants. The term "higher aquatic plant" means aquatic plants which are botanically higher than algae and is inclusive of vegetative organisms growing in water in which a major part of such organisms are normally largely submerged, e.g., roots as in lemna, leaves as in Vallisneria or entire plants such as Anacharis. Thus, the term "higher aquatic plant" is inclusive of all water plants whether normally free floating in their environing water such as Salvinia, or immersed species which are normally rooted in soil such as Vallisneria, as well as species which appear to grow normally in all respects either free-floating or rooted such as Anacharis.

The N-(cycloalken-1-yl)-alpha-haloacetamides of this invention are of the formula

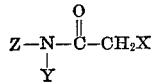

wherein
X is halogen;
Z is selected from the group consisting of
  (I) hydrogen;
  (II) $X_n{}^1R$ wherein R is hydrocarbyl of not more than 18 carbon atoms selected from the group consisting of alkyl, alkenyl and alkynyl, $X^1$ is halogen and n is an interger from 0 to 3, inclusive,
  (III) cycloalkyl, alkylcycloalkyl and alkoxycycloalkyl of at least 3 and not more than 8 ring carbon atoms, and not more than 12 chain carbon atoms,
  (IV) $R^3O$—$[R^2O]_m$—$R^1$— wherein $R^1$ is selected from the group consisting of alkylene and alkoxyalkylene of not more than 8 carbon atoms, $R^2$ is alkylene of not more than 4 carbon atoms, $R^3$ is selected from the group consisting of alkyl and alkenyl of not more than 4 carbon atoms and m is an integer from 0 to 1, and
  (V) aromatic group selected from the group consisting of phenyl, naphthyl, benzyl and alkyl substituted phenyl, naphthyl and benzyl having a maximum of 18 carbon atoms,
Y is cycloalkenyl of at least 5 and not more than 7 carbon atoms in the ring selected from the group consisting of

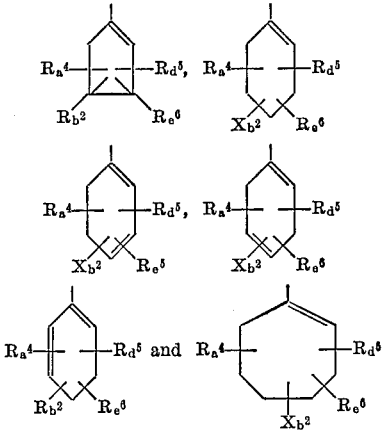

wherein $R^4$ is alkyl of not more than 4 carbon atoms; $R^5$ is alkoxy of not more than 4 carbon atoms; $R^6$ is phenyl, $X^2$ is halogen; a, b and d are each integers from 0 to 3 inclusive and e is an integer from 0 to 1.

A preferred embodiment of this invention is the utilization of one or more compounds of the formula

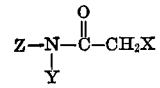

wherein
X is chlorine, bromine or iodine;
Z is selected from the group consisting of
  (I) $X_n{}^1R$ where R is hydrocarbyl of not more than 10 carbon atoms selected from the group consisting of alkyl and alkenyl, $X^1$ is chlorine, bromine or iodine and n is an integer 0 to 1;
  (II) cycloalkyl and alkylcycloalkyl having at least 5 and a maximum of 7 ring carbons and a maximum of 6 chain carbons; and
  (III) $R^3O$—$[R^2O]_m$—$R^1$— wherein $R^1$ is selected from the group consisting of alkylene and alkoxyalkylene of not more than 8 carbon atoms, $R^2$ is alkylene of not more than 4 carbon atoms, $R^3$ is selected from the group consisting of alkyl and alkenyl of not more than 4 carbon atoms and m is an integer from 0 to 1; and
Y is cycloalkenyl of at least 5 and not more than 7 carbon atoms in the ring selected from the group consisting of

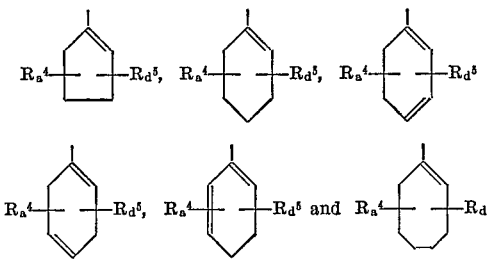

wherein $R^4$ is alkyl of not more than 4 carbon atoms; $R^5$ is alkoxy of not more than 4 carbon atoms; and a and d are integers from 0 to 3, inclusive.

A more preferred embodiment of this invention is the utilization of one or more compounds of the formula

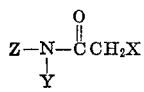

wherein

X is chlorine, bromine and iodine;

Z is selected from the group consisting of
 (I) R wherein R is hydrocarbyl of not more than 10 carbon atoms selected from the group consisting of alkyl and alkenyl; and
 (II) $R^3O—[R^2O]_m—R^1—$ wherein $R^1$ is selected from the group consisting of alkylene and alkoxyalkylene of not more than 8 carbon atoms, $R^2$ is alkylene of not more than 4 carbon atoms, $R^3$ is selected from the group consisting of alkyl and alkenyl of not more than 4 carbon atoms and $m$ is an integer from 0 to 1; and Y is cycloalkenyl of at least 5 and not more than 7 carbon atoms in the range selected from the group consisting of

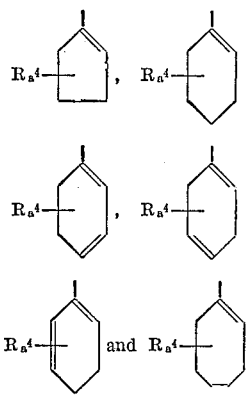

wherein $R^4$ is alkyl of not more than 4 carbon atoms; and $a$ is an integer 0 to 3.

In the above formula, the alkylene portion of $R^1$ can be straight or branched. Preferably, the alkylene portion of $R^1$ is of at least 2 carbon atoms, and said carbon atoms are between the nitrogen and oxygen atoms.

Representative Z radicals for the alpha-haloacetamides of this invention include alkyl such as methyl, ethyl, n-butyl, sec-butyl, isobutyl, tert-butyl, amyl, hexyl, heptyl, octyl, nonyl, decyl, dodecyl and the various homologues and isomers of alkyl having 1 through 18 carbon atoms; alkenyl such as vinyl, allyl, n-butenyl-1, n-butenyl-2, n-pentenyl-2, n-hexenyl-2, 2,3-dimethylbutenyl-2, n-heptenyl, n-decenyl, n-dodecenyl and the various homologues and isomers of alkenyl having 2 through 18 carbon atoms; alkynyl such as propargyl, butynyl, pentynyl and the various homologues and isomers of alkynyl having 3 through 18 carbon atoms; haloalkyl such as chloromethyl, iodomethyl, bromomethyl, fluoromethyl, chloroethyl, iodoethyl, bromoethyl, fluoroethyl, trichloromethyl, diiodoethyl, tribromomethyl, trifluoromethyl, dichloroethyl, chloro-n-propyl, bromo-n-propyl, iodoisopropyl, bromo-n-butyl, bromo-tert-butyl, 1,3,3-trichlorobutyl, 1,3,3-tribromobutyl, chloropentyl, bromopentyl, 2,3-dichloropentyl, 3,3-dibromopentyl, chlorohexyl, bromohexyl, 2,4-dichlorohexyl, 1,3-dibromohexyl, 1,3,4-trichlorohexyl, chloroheptyl, bromoheptyl, fluoroheptyl, 1,3-dichloroheptyl, 1,4,4-trichloroheptyl, 2,4-dichloromethylheptyl, chlorooctyl, bromooctyl, iodooctyl, 2,4-dichloromethylhexyl, 2,4 - dichlorooctyl, 2,4,4 - trichloromethylpentyl, 1,3,5-tribromooctyl and the halogenated straight and branched chain alkyl having 1 through 18 carbon atoms; haloalkenyl such as chlorovinyl, bromovinyl, chloroallyl, bromoally, 3-chlolo - n - butenyl-1, 3-chloro-n-pentenyl-1, 3-fluoro-n-heptenyl-1, 1,3,3-trichloro-n-heptenyl-5, 1,3,5-trichloro-n-octenyl-6, 2,3,3-trichloromethylpentenyl-4 and the various homologues and isomers of haloalkenyl having 2 through 18 carbon atoms; haloalkynyl such as chloropropargyl, bromopropargyl, 2-chlorobutynyl-1, 4-bromobutynyl-2, chloropentynyl and the various homologues and isomers of haloalkynyl having 3 through 18 carbon atoms; cycloalkyl, alkylcycloalkyl and alkoxycycloalkyl such as cyclopentyl, 3-methylcycopenty, 3-methylcyclopentyl, 3,4-dimethylcyclopentyl, 2,5-dimethylcyclopentyl, 5-methoxycyclopentyl, 3,4-dimethylcyclopentyl, 5-(tert-butyl) - cyclopentyl, 1 - cyclohexyl, 3 - methylcyclohexyl, 3,4-dimethylcyclohexyl, 6-methoxycyclohexyl, 2,4-dimethylcyclohexyl, 3-methylcyclohexyl, 3,4-dimethoxycyclohexyl, 2,6-dimethylcyclohexyl, 3,3-dimethylcyclohexyl, 6-(tert-butyl)cyclohexyl, cycloheptyl, 3-methylcycloheptyl, 3,4-dimethylcycloheptyl, 7-methylcycloheptyl, 4,5-dimethylcycloheptyl, 2-methoxycycloheptyl, 6-methylcycloheptyl, 7-methylcycloheptyl, 7-(tert-butyl)-cycloheptyl, 3,4-diisopropylcycloheptyl, cyclooctyl, 3,4-dimethylcyclooctyl, 4-methoxycyclooctyl and the like; alkoxyalkyl, alkenoxyalkyl, alkoxyalkoxyalkyl, alkenoxyalkylalkyl, dialkoxyalkyl, alkenoxy(alkoxy)alkyl, alkenoxyalkoxy(alkoxy)alkyl and alkoxyalkoxy(alkoxy)alkyl such as methoxyethyl, 2-ethoxyethyl, 3-propoxypropyl, 4-methoxybutyl, 4-butoxybutyl, 2-allyloxyethyl, 2-butenoxyethyl, 4-butenoxybutyl, 2-(2-methoxyethoxy)ethyl, 2-(2-butoxyethoxy)ethyl, 4-(3-methoxypropoxy)butyl, 2-(3-allyloxypropoxy)ethyl, 2-(2-butenoxyethoxy)ethyl, 4,4-dimethoxybutyl, 2,2-diethoxyethyl, 2,4-dimethoxybutyl, 4,4-diethoxybutyl, 2-methoxy-4-allyloxybutyl, 2-ethoxy-2-propenoxyethyl, 4-(2-allyloxyethoxy)-2-methoxybutyl, 2-(4-methoxybutoxy)-2-methoxyethyl, 4-(2-methoxyethoxy)-4-butoxybutyl and the like, and aryl, alkaryl and aralkyl such as phenyl, tolyl, ethylphenyl, butylphenyl, xylyl, t-butylphenyl, trimethylphenyl, diethylphenyl, diphenylmethyl, naphthyl, biphenyl, benzyl, phenylethyl and the like.

Representative Y cycloalkenyl radicals for the alpha-chloroacetamides of this invention include by way of example:

1-cyclopentenyl,
3-methyl-1-cyclopentenyl,
5-methoxy-1-cyclopentenyl,
3,4-dimethyl-1-cyclopentenyl,
3-methoxy-4-methyl-1-cyclopentenyl,
2,5-dimethyl-1-cyclopentenyl,
5-methyl-5-cyclopentenyl,
3,4-dichloro-5-cyclopentenyl,
5-(tert-butyl)-1-cyclopentenyl,
1-cyclohexyenyl,
3-methyl-1-cyclohexenyl,
3,4-dimethyl-1-cyclohexenyl,
6-methoxy-1-cyclohexenyl,
2,4-dimethyl-1-cyclohexenyl,
3-methyl-6-cyclohexenyl,
3,4-diethoxy-6-cyclohexenyl,
2,6-dichloro-1-cyclohexenyl,
3,3-dimethyl-1-cyclohexenyl,
6-pentyl-1-cyclohexenyl,
1,3-cyclohexadienyl,
3-methyl-1,3-cyclohexadienyl,
3,4-dimethoxy-1,3-cyclohexadienyl,
6-methyl-1,3-cyclohexadienyl,
2,4-dimethyl-1,3-cyclohexadienyl,
3-methyl-4,6-cyclohexadienyl,
3,4-dichloro-4,6-cyclohexadienyl,
2,6-dimethyl-4,6-cyclohexadienyl,
5,5-dimethyl-1,3-cyclohexadienyl,
6-penyl-1,3-cyclohexadienyl,
3,5,5-trimethyl-1,3-cyclohexadienyl,
1,4-cyclohexadienyl,
3-methyl-1,4-cyclohexadienyl,
3,4-dibutoxy-1,4-cyclohexadienyl,
6-methyl-1,4-cyclohexadienyl,
2,4-dimethyl-1,4-cyclohexadienyl,
2,6-dibromo-1,4-cyclohexadienyl, 2,5-dimethyl-1,4-cyclohexadienyl,
6-(tert-butyl)-1,4-cyclohexadienyl,
3,6,6-trimethyl-1,4-cyclohexadienyl,
3-methyl-3,6-cyclohexadienyl,
6-methyl-3,6-cyclohexadienyl,
2,6-dimethyl-3,6-cyclohexadienyl,
2,5,5-trimethoxy-3,6-cyclohexadienyl,
3,5,5-trimethyl-3,6-cyclohexadienyl,
2,4-dichloro-3,6-cyclohexadienyl,
6-(tert-butyl)-3,6-cyclohexadienyl,
1,5-cyclohexadienyl,
3-methyl-1,5-cyclohexadienyl,
3,4-dimethyl-1,5-cyclohexadienyl,
6-isopropyl-1,5-cyclohexadienyl,
6-tert-butyl-1,5-cyclohexadienyl,
2,6-dimethyl-1,5-cyclohexadienyl,
3-phenyl-2,6-cyclohexadienyl,
2,5,5-triethyl-2,6-cyclohexadienyl,
3,5,5-trimethyl-2,6-cyclohexadienyl,
6-(tert-butyl)-2,6-cyclohexadienyl,
6-methyl-2,6-cyclohexadienyl,
1-cycloheptenyl,
3-phenyl-1-cycloheptenyl,
3,4-dimethyl-1-cycloheptenyl,
7-methyl-1-cycloheptenyl,
4,5-dimethyl-1-cycloheptenyl,
2-methoxy-1-cycloheptenyl,
6-methyl-1-cycloheptenyl,
7-chloro-7-cycloheptenyl,
7-(tert-butyl)-1-cycloheptenyl, and
3,4-diisopropyl-1-cycloheptenyl.

The present N-(cycloalken-1-yl) alpha-chloroacetamides are prepared by a process which comprises reacting a haloacetyl halide with an imine of the formula Z—N=A where in Z is as defined above and A is selected from the group consisting of

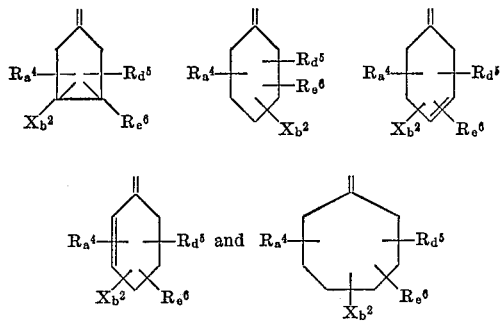

wherein $R^4$, $R^5$, $R^6$, $X^2$, $a$, $b$, $c$ and $e$ are as defined above.

The synthesis of the present compounds can be set forth as follows:

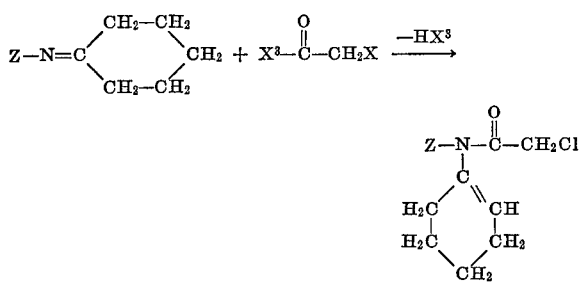

wherein Z and X are as defined above and $X^3$ is Cl, Br or I.

The reaction of the haloactyl halides with imines in accordance with this invention can be carried out in various ways. Normally it is desired for maximum yield that the imine be present in at least an equimolar amount to the haloacetyl halide and preferably in excess of equimolar amount. The reaction is suitably carried out at room temperature, i.e., about 20–25° C. However, higher or lower temperatures can be used, the temperature not being critical. For example, temperatures above about 40° C. are generally employed when no acid acceptor is used.

The reaction is preferably carried out in the presence of an acid acceptor and an inert organic medium. The acid acceptor is generally present in at least equimolar amounts based on the amount of hydrogen halide formed in the reaction. Suitable acid acceptors, e.g., alkaline-acting or basic materials capable of binding the acid evolved in the reaction are the tertiary amines such as trimethylamine, triethylamine, pyridine, quaternary ammonium hydroxides, N-ethylmorpholine and the like; inorganic bases such as sodium hydroxide and potassium hydroxide, sodium carbonate and the like. An excess of imine reactant also serves as an acid acceptor.

Inert organic media which can be used in the practice of this invention include by way of example hydrocarbons such as benzene, toluene, xylene, cyclohexane, methylcyclohexane, n-heptane, n-hexane and the like; ethers such as isopropyl ether, n-butyl ether, 1,4-dioxane, isobutyl ether, diethyl ether and the like; aliphatic and cycloaliphatic ketones such as methyl isopropyl ketone, methyl isobutyl ketone, methyl isoamyl ketone, diisopropyl ketone, cyclohexanone and the like; and organic halides such as carbon tetrachloride, n-butyl chloride, ethylene dichloride, tetrachloroethylene and the like.

The separation of the resulting reaction product from the reaction mixture is readily accomplished. For example the salt, such as tertiary amine hydrochloride salt formed during the reaction because of the presence of a tertiary amine compound therein as an acid acceptor, is separated from the product containing reaction mixture by simple means such as filtration and the solvent is removed from the resulting filtrate by stripping or distillation, preferably low temperature vacuum distillation, the product can be purified by any of the conventional means well known in the art, e.g. fractional distillation under reduced pressure, selective extraction, fractional distillation using a carrier gas or any suitable combination of these. If desired the product can be subjected to film distillation, recrystallization or a combination of both for further purification.

The N-(cycloalken-1-yl) alpha-haloacetamides of this invention are liquid or crystalline solid materials which are insoluble in water but somewhat soluble in many organic solvents such as alcohols, ketones, benzene, toluene, xylene, hexane or the like.

While the present N-(cycloalken-1-yl) alpha-haloacetamides are useful as fungicides, insecticides, nematocides, bactericides, bacteriostats, and fungistats, their most outstanding characteristic is the inhibition of plant growth. In accordance with this invention it has been found that the growth of dormant seeds, germinant seeds, germinative seeds, emerging seedlings, established woody and herbaceous vegetation and aquatic plants can be inhibited by exposing the seeds, emerging seedlings, or the roots or above-ground portions of established vegetation, or the aquatic plants to the action of an effective amount of one or more N-(cycloalken-1-yl) alpha-haloacetamide of the present invention. The N-(cyclohexen-1-yl) alpha-haloacetamides can be used as individual compounds, as admixtures of two or more compounds, or in admixture with an adjuvant. These compounds are effective as general plant growth inhibitor, including post-emergent herbicides and pre-emergent herbicides, but their most outstanding utility is as selective pre-emergent herbicides, e.g., the selective inhibition of the growth of one or more monocotyledonous species and/or one or more dicotyledonous species in the presence of other monocotyledons and/or dicotyledons. Furthermore, these compounds are characterized by broad spectrum activity; i.e., they modify the growth of a wide variety of plants including but not limited to ferns, conifers (pine, fir and the like), aquatic, monocotyledons and dicotyledons.

For the sake of brevity and simplicity, the term "active ingredient" will be used hereinafter to describe the present N-(cycloalken-1-yl) alpha-haloacetamides.

The herbicidal compositions of this invention contain at least one active ingredient and an adjuvant in liquid or solid form. The compositions are prepared by admixing the active ingredient with an adjuvant including diluents, extenders, carriers and conditioning agents to provide compositions in the form of finely-divided particulate solids, granules, pellets, solutions, dispersions or emulsions. Thus the active ingredient can be used with an adjuvant such as a finely-divided solid, a liquid or organic origin, water, a wetting agent, a dispersing agent, an emulsifying agent or any suitable combination of these.

Typical finely divided carriers and extenders for the plant growth regulant compositions of this invention include by way of example the talcs, clays, pumice, silica, diatomaceous earth, walnut flour, chalk, quartz, fuller's earth, salt, sulfur, powdered cork, powdered wood, charcoal, ground corn cobs, illite clay, tobacco dust, volcanic ash, cottonseed hulls, wheat flour, soybean flour, tripoli and the like. Typical liquid diluents include water, kerosene, Stoddard solvent, hexane, toluene, benzene, acetone, ethylene dichloride, xylene, alcohols, Diesel oil, glycols and the like.

The herbicidal compositions of this invention, particularly liquids and wettable particles, usually contain as a conditioning agent one or more surface-active agents in amounts sufficient to render a given composition readily dispersible in water or in oil. By the term "surface-active agent" it is understood that wetting-agents, dispersing agents, suspending agents and emulsifying agents are included therein.

The term 'herbicidal composition" as used herein and in the appended claims is intended to mean not only compositions in a suitable form for application but also concentrated compositions which require dilution or extension with a suitable quantity of liquid or solid adjuvant prior to application.

The following examples will illustrate the invention. In the following examples as well as in the specification and appended claims, parts and percent are by weight unless otherwise indicated.

EXAMPLE 1

This example describes the preparation of N-(1-cyclohexen-1-yl) N-(isobutyl) alpha-chloroacetamide

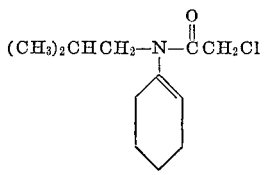

Into a solution of 33.9 parts of chloroacetyl chloride in 200 parts of benzene maintained at a temperature of about 5° C. are added slowly with stirring 45.9 parts of N-cyclohexylidene N-isobutyl amine. After stirring for an additional 30 minutes at about 5° C., 30.3 parts of triethyl amine are added. The reaction mixture is allowed to warm to about 25° C. and is stirred for one hour. The reaction mixture is then filtered to remove the amine salts and the filtrate is washed twice with water. The benzene is removed by evaporation and the residue is fractionally distilled to obtain the product fraction boiling in the range of 130° C. to 134° C., at a pressure of 3 mm. of mercury. The product amounts to 36.1 parts of oily liquid and the structure is confirmed by nuclear magnetic resonance (NMR) spectrum analysis.

Calc'd for $C_{12}H_{20}NOCl$ (percent): C, 63.0; H, 8.74; Cl, 15.50. Found (percent): C, 63.63; H, 8.85; Cl, 15.39.

EXAMPLE 2

This example describes the preparation of N-(1-cyclohexen-1-yl) N-(n-propyl) alpha-chloroacetamide

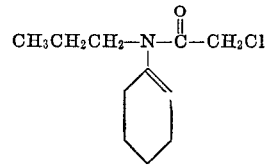

Into a solution of 33.9 parts of chloroacetyl chloride in 250 parts of benzene maintained at a temperature of about 5° C. are added slowly with stirring 41.7 parts of N-cyclohexylidene N-(n-propyl) amine. After stirring for an additional 30 minutes at about 5° C., 30.3 parts of triethyl amine are added and the reaction mixture is allowed to warm to about 25° C. The reaction mixture is stirred for one hour at 25° C., filtered, washed twice with water and the benzene removed by evaporation. The residue is fractionally distilled to obtain the product fraction boiling in the range of 125° C. to 126° C. at a pressure of 3 mm. of mercury. This fraction is dissolved in hexane and recrystallized to obtain 37.8 parts of solid product having a M.P. of 45–47° C. The structure is confirmed by NMR spectrum analysis.

Calc'd for $C_{11}H_{18}NOCl$ (percent): C, 61.40; H, 8.37; Cl, 16.50. Found (percent): C, 61.54; H, 8.50; Cl, 16.08.

EXAMPLE 3

This example describes the preparation of N-(1-cyclohexen-1-yl) N-(ethyl) alpha-chloroacetamide

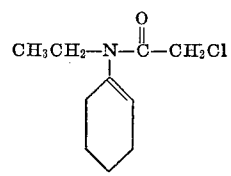

Into a solution of 33.9 parts of chloroacetyl chloride in 250 parts of benzene maintained at a temperature of about 5° C. are added slowly with stirring 37.5 parts of N-cyclohexylidene ethyl amine. After stirring for an additional 30 minutes at about 5° C., 30.3 parts of triethyl amine are added and the reaction mixture is allowed to warm to about 25° C. The reaction mixture is stirred for one hour at 25° C., filtered, washed twice with water and the benzene removed by evaporation. The residue is fractionally distilled to obtain the product fraction boiling in the range of 115° C. to 120° C., at a pressure of 2 mm. of mercury. This fraction is dissolved in hexane and recrystallized to obtain 37.4 parts of solid product having a M.P. of 27–28° C. The structure is confirmed by NMR spectrum analysis.

Calc'd for $C_{10}H_{16}NOCl$ (percent): N, 6.98; Cl, 17.65; M.W., 201. Found (percent): N, 7.30; Cl 18.20; M.W., 200.

EXAMPLE 4

This example describes the preparation of N-(1-cyclohexen-1-yl) N-(2-methoxyisopropyl) alpha-chloroacetamide.

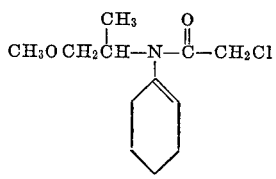

Into a solution of 22.4 parts of chloroacetyl chloride in 150 parts of benzene maintained at a temperature of about 5° C. are added with stirring 34 parts of N-cyclohexylidene N-(2-methoxyisopropyl)amine. After stirring for an additional 30 minutes, 20.2 parts of triethyl amine are added and the reaction mixture is allowed to warm to about 25° C. The reaction mixture is stirred for one hour at 25° C., filtered, washed twice with water and the benzene removed by evaporation. The residue is fractionally distilled to obtain the product fraction boiling in the range of 146° C. to 150° C., at a pressure of 2 mm. of mercury. The product fraction amounts of 24.1 parts of an oily liquid and has the assigned structure.

Calc'd for $C_{12}H_{19}O_2NCl$ (percent): Cl, 14.4; N, 5.7. Found (percent): Cl, 14.19; N, 5.94.

EXAMPLE 5

This example describes the preparation of N-(1-cyclopenten-1-yl) N-(isopropyl) alpha-chloroacetamide

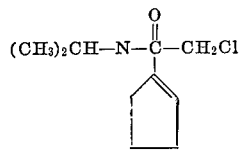

Into a solution of 22.6 parts of chloroacetyl chloride in benzene maintained at a temperature of about 5° C. are added with stirring 25 parts of N-cyclopentylidene N-isopropyl amine. After stirring for an additional 30 minutes, 20 parts of triethyl amine are added. The reaction mixture is filtered, washed with water and the filtrate dried over $MgSO_4$. The residue is fractionally distilled to obtain the product fraction boiling in the range of 120° C. to 122° C., at a pressure of 2 mm. of mercury. The product amounts of 12.5 parts and the assigned structure is confirmed by NMR spectrum analysis.

Calc'd for $C_{10}H_{16}NOCl$ (percent): Cl, 17.7; N, 6.95. Found (percent): Cl, 19.20; N, 7.05.

EXAMPLE 6

This example describes the preparation of N-(1-cyclohexen-1-yl) N-(2-propen-1-yl) alpha-chloroacetamide

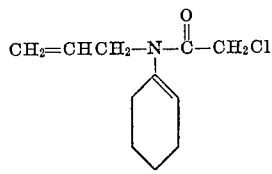

Into a solution of 33.9 parts of chloroacetyl chloride in 250 parts of benzene maintained at a temperature of about 5° C. are added with stirring 41 parts of N-(cyclohexylidene) N-(2-propen-1-yl) amine. After stirring for an additional 30 minutes, 30.3 parts of triethyl amine are added and the reaction mixture is allowed to warm to about 25° C. The reaction mixture is stirred for one hour at 25° C., filtered, washed twice with water and the benzene removed by evaporation. The residue is fractionally distilled to obtain the product fraction boiling at 136° C., at a pressure of 2 mm. of mercury. The product amounts to 37.7 parts and the assigned structure is confirmed by NMR spectrum analysis.

Calc'd for $C_{11}H_{16}NOCl$ (percent): C, 62.0; H, 7.52; Cl, 16.65. Found (percent): C, 61.4; H, 7.29; Cl, 16.73.

EXAMPLE 7

This example describes the preparation of N-(2-methyl-6-cyclohexen-1-yl) N-methyl alpha-chloroacetamide

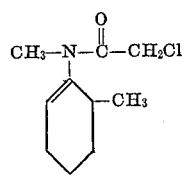

Into a solution of 5.6 parts of chloroacetyl chloride in 250 parts of benzene maintained at a temperature of about 5° C. are added slowly with stirring 7.2 parts of N-(2-methylcyclohexylidene) N-methyl amine. After stirring for an additional 30 minutes at about 5° C., 6.9 parts of triethyl amine are added and the reaction mixture is heated at reflux for about 1 hour. The reaction mixture is cooled, filtered, washed with water and the benzene removed by evaporation. The residue is fractionally distilled to obtain the product fraction boiling in the range of 125° C. to 130° C., at a pressure of 1 mm. of mercury. This fraction is dissolved in hexane and recrystallized to obtain a solid product having a M.P. of 36–38° C. The assigned structure is confirmed by NMR spectrum analysis.

Calc'd for $C_{10}H_{16}NOCl$ (percent): C, 59.50; H, 7.95; Cl, 17.70; N, 6.95. Found (percent): C, 59.50; H, 7.89; Cl, 17.84; N, 7.06.

EXAMPLE 8

This example describes the preparation of N-(4-methyl-1-cyclohexen-1-yl) N-isopropyl alpha-chloroacetamide

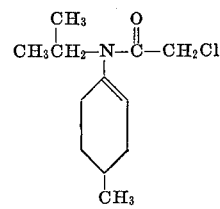

Into a solution of 36.8 parts of chloroacetyl chloride in 250 parts of benzene are added with stirring 100 parts of N-(4-methylcyclohexylidene) N-isopropyl amine. The reaction mixture is allowed to warm to about 50° C. and is stirred for 3 hours. The reaction mixture is filtered, washed with water and the benzene removed by evaporation. The residue is fractionally distilled to obtain the product fraction, 36.6 parts, having a boiling point of 150° C., at a pressure of 1.5 mm. of mercury. The assigned structure of the product oil is confirmed by NMR spectrum analysis.

Calc'd for $C_{12}H_{21}NOCl$ (percent): N, 6.09; Cl, 15.4. Found (percent): N, 6.07; Cl, 15.35.

EXAMPLE 9

This example describes the preparation of N-(1,3-cyclohexadien-1-yl) N-isopropyl alpha-chloroacetamide

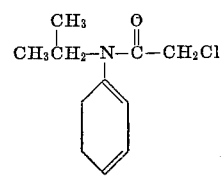

Into a solution of 22.4 parts of chloroacetyl chloride in 250 parts of benzene maintained at a temperature of about 5° C. are added slowly with stirring 27.6 parts of N-(3-cyclohexen-1-ylidene) N-isopropyl amine. After stirring for an additional 30 minutes at about 5° C., 8.6 parts of triethyl amine are added and the reaction mixture is allowed to warm to about 25° C. The reaction mixture is filtered, washed twice with water and the benzene removed by evaporation. The residue is fractionally distilled to obtain the product fraction boiling in the range of 125° C. to 129° C., at a pressure of 1 mm. of mercury. The fraction is dissolved in hexane and recrystallized to obtain the white solid product having a M.P. of 34–36° C. The assigned structure is confirmed by NMR spectrum analysis.

Calc'd for $C_{11}H_{17}NOCl$ (percent): N, 6.56; Cl, 16.7. Found (percent): N, 6.63; Cl, 16.52.

EXAMPLE 10

This example describes the preparation of N-(3,5,5-trimethyl-1,3-cyclohexadien-1-yl) N-(ethoxyethyl) alpha-chloroacetamide (a)

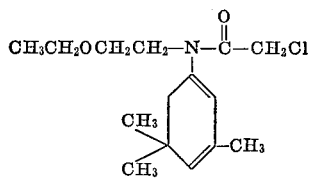

N-(3,5,5-trimethyl-2,6-cyclohexadien-1-yl) N-ethoxyethyl alpha-chloroacetamide (b)

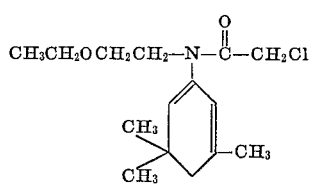

N-(3,5,5-trimethyl-3,6-cyclohexadien-1-yl) N-ethoxyethyl alpha-chloroacetamide (c)

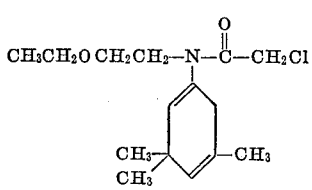

Into a solution of 11.3 parts of chloroacetyl chloride in 150 parts of benzene maintained at a temperature of about 5° C. are added slowly with stirring 20.9 parts of N-(3,5,5-trimethyl - 2 - chlohexen - 1 - ylidene) N-ethoxyethyl amine. After stirring for an additional 30 minutes at about 5° C., 4.3 parts of triethyl amine are added and the reaction mixture is allowed to warm to about 25° C. The reaction mixture is filtered, washed twice with water and the benzene removed by evaporation. NMR spectrum analysis shows that the residue contains the compounds represented by the Formulae a, b and c above. The residue is fractionally distilled to obtain the product fraction 12.7 parts, having a boiling point of 135° C., at a pressure of 6 mm. of mercury. NMR spectrum analysis shows that the product is composed primarily of the compound represented by Formula a above.

Calc'd for $C_{15}H_{24}NO_2Cl$ (percent): C, 63.20; H, 8.42; N, 4.90; Cl, 12.45. Found (percent): C, 63.33; H, 8.35; N, 4.90; Cl, 12.42.

EXAMPLE 11

This example describes the preparation of N-(2,6-dimethyl-1-cyclohexen-1-yl) alpha-chloroacetamide.

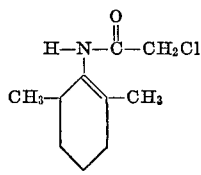

A reaction vessel is charged with 11.3 parts of chloroacetyl chloride, 150 parts of chlorobenzene and 25 parts of N-2,6-dimethylcyclohexylidene amine. The reaction mixture is refluxed for several hours, cooled and filtered to obtain 13.5 parts of solid product, M.P. 114–115° C.

Calc'd for $C_{10}H_{17}ONCl$ (percent): Cl, 17.55; N, 6.93. Found (percent): Cl, 17.86; N, 7.02.

EXAMPLE 12

This example describes the preparation of N-(2-phenyl-1-cyclohexen-1-yl) N - (2 - propen - 1 - yl) alpha-chloroacetamide

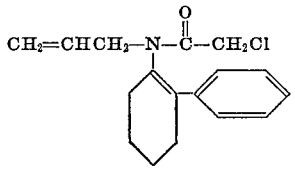

A reaction vessel was charged with 6.8 parts of chloroacetyl chloride, 150 parts of chlorobenzene and 12.8 parts of N-2-phenylcyclohexylidene N - (2-propen-1-yl)amine. The reaction mixture is heated at reflux for about 3 hours, cooled and the chlorobenzene removed by evaporation under vacuum. The residue is fractionally distilled to obtain the product fraction boiling at 186° C. at pressure of 1 to 2 mm. of mercury. The product fraction amounts to 12.4 parts and has the assigned structure.

Calc'd for $C_{17}H_{20}ONCl$ (percent): Cl, 12.3; N, 4.85. Found (percent): Cl, 12.37; N, 4.98.

Following the procedure of the foregoing examples and using the appropriate haloacetyl halide and the appropriate imine compound, the following N-(cycloalken-1-yl) alpha-haloacetamides are prepared.

| Example | Compounds |
| --- | --- |
| 13 | N-(1-cyclohexen-1-yl)-N-methyl-alpha-chloroacetamide |
| 14 | N-(2-methyl-1-cyclohexen-1-yl)-N-methyl-alpha-chloroacetamide |
| 15 | N-(1-cyclohexen-1-yl)-N-isopropyl-alpha-chloroacetamide |
| 16 | N-(1-cyclohexen-1-yl)-N-ethyl-alpha-chloroacetamide |
| 17 | N-(1-cyclohexen-1-yl)-N-n-propyl-alpha-chloroacetamide |
| 18 | N-(1-cyclohexen-1-yl)-N-2-methylpropyl-alpha-chloroacetamide |
| 19 | N-(1-cyclohexen-1-yl)-N-allyl-alpha-chloroacetamide |
| 20 | N-(1-cyclohexen-1-yl)-N-(3-methoxypropyl)-alpha-chloroacetamide |
| 21 | N-(1-cyclohexen-1-yl)-N-(2-methoxyethyl)-alpha-chloroacetamide |
| 22 | N-(1-cyclohexen-1-yl)-N-(1-methyl-2-methoxyethyl)-alpha-chloroacetamide |
| 23 | N-(5-methyl-1-cyclohexen-1-yl)-N-isopropyl-alpha-chloroacetamide |
| 24 | N-(1-cyclohexen-1-yl)-N-(2-ethoxyethyl)-alpha-chloroacetamide |
| 25 | N-(4-methyl-1-cyclohexen-1-yl)-N-isopropyl-alpha-chloroacetamide |
| 26 | N-(2-methyl-1-cyclohexen-1-yl)-N-(2-methoxyethyl)-alpha-chloroacetamide |
| 27 | N-(2-ethyl-1-cyclohexen-1-yl)-N-(2-methoxyethyl)-alpha-chloroacetamide |
| 28 | N-(2-methyl-1-cyclohexen-1-yl)-N-allyl-alpha-chloroacetamide |
| 29 | N-(2,6-dimethyl-1-cyclohexen-1-yl)-N-(2-methoxyethyl)-alpha-chloroacetamide |
| 30 | N-(2-ethyl-1-cyclohexen-1-yl)-N-allyl-alpha-chloroacetamide |
| 31 | N-(1-cyclohexen-1-yl)-N-benzyl-alpha-chloroacetamide |
| 32 | N-(3-methyl-1-cyclohexen-1-yl)-N-allyl-alpha-chloroacetamide |
| 33 | N-(2,6-dimethyl-1-cyclohexen-1-yl)-N-allyl-alpha-chloroacetamide |
| 34 | N-(2-isopropyl-1-cyclohexen-1-yl)-N-(2-methoxyethyl)-alpha-chloroacetamide |
| 35 | N-(2,6-dimethyl-1-cyclohexen-1-yl)-N-methyl-alpha-chloroacetamide |
| 36 | N-(4-isopropyl-1-cyclohexen-1-yl)-N-allyl-alpha-chloroacetamide |
| 37 | N-(4-tert-butyl-1-cyclohexen-1-yl)-N-allyl-alpha-chloroacetamide |
| 38 | N-(3,5-dimethyl-1-cyclohexen-1-yl)-N-allyl-alpha-chloroacetamide |
| 39 | N-(4-methyl-1-cyclohexen-1-yl)-N-allyl-alpha-chloroacetamide |
| 40 | N-(2-tert-butyl-1-cyclohexen-1-yl)-N-ethyl-alpha-chloroacetamide |
| 41 | N-(2,3-dimethyl-1-cyclohexen-1-yl)-N-allyl-alpha-chloroacetamide |
| 42 | N-(3,4-dimethyl-1-cyclohexen-1-yl)-N-allyl-alpha-chloroacetamide |
| 43 | N-(2-methyl-6-tert-butyl-1-cyclohexen-1-yl)-N-methyl-alpha-chloroacetamide |
| 44 | N-(2-methyl-1-cyclohexen-1-yl)-N-tert-butyl-alpha-chloroacetamide |
| 45 | N-(2,6-dimethyl-1-cyclohexen-1-yl)-N-ethyl-alpha-chloroacetamide |
| 46 | N-(2,6-dimethyl-1-cyclohexen-1-yl)-N-tert-butyl-alpha-chloroacetamide |
| 47 | N-(2,3-dimethyl-1-cyclohexen-1-yl)-N-ethyl-alpha-chloroacetamide |
| 48 | N-(2-methyl-1-cyclohexen-1-yl)-N-(2-ethoxyethyl)-alpha-chloroacetamide |
| 49 | N-(1-cyclohexen-1-yl)-N-(2,2-diethoxyethyl)-alpha-chloroacetamide |
| 50 | N-(2-methyl-1-cyclohexen-1-yl)-N-(2,2-dimethoxyethyl)-alpha-chloroacetamide |
| 51 | N-(1-cyclohexen-1-yl)-N-(2,2-dimethoxyethyl)-alpha-chloroacetamide |

| Example | Compounds |
|---|---|
| 52 | N-(6-tert-butyl-1-cyclohexen-1-yl)-N-(2-methoxyethyl)-alpha-chloroacetamide |
| 53 | N-(6-methyl-1-cyclohexen-1-yl)-N-(2-methoxyethyl)-alpha-chloroacetamide |
| 54 | N-(3,5-dimethyl-1-cyclohexen-1-yl)-N-(2-methoxyethyl)-alpha-chloroacetamide |
| 55 | N-(2,6-dimethyl-1-cyclohexen-1-yl)-N-(3-methoxypropyl)-alpha-chloroacetamide |
| 56 | N-(2,6-dimethyl-1-cyclohexen-1-yl)-N-(2-ethoxyethyl)-alpha-chloroacetamide |
| 57 | N-(2,6-di-isopropyl-1-cyclohexen-1-yl)-N-allyl-alpha-chloroacetamide |
| 58 | N-(3-methyl-6-tert-butyl-1-cyclohexen-1-yl)-N-(2-methoxyethyl)-alpha-chloroacetamide |
| 59 | N-(3-methyl-1-cyclohexen-1-yl)-N-(2-ethoxyethyl)-alpha-chloroacetamide |
| 60 | N-(4-methyl-1-cyclohexen-1-yl)-N-(2-ethoxyethyl)-alpha-chloroacetamide |
| 61 | N-(3,5-dimethyl-1-cyclohexen-1-yl)-N-(2-ethoxyethyl)-alpha-chloroacetamide |
| 62 | N-(2-n-butyl-1-cyclohexen-1-yl)-N-(2-ethoxyethyl)-alpha-chloroacetamide |
| 63 | N-(2,3-dimethyl-1-cyclohexen-1-yl)-N-(2-ethoxyethyl)-alpha-chloroacetamide. |
| 64 | N-(2,4-dimethyl-1-cyclohexen-1-yl)-N-(2-ethoxyethyl)-alpha-chloroacetamide |
| 65 | N-(2,5-dimethyl-1-cyclohexen-1-yl)-N-(2-ethoxyethyl)-alpha-chloroacetamide |
| 66 | N-(2-methyl-6-n-propyl-1-cyclohexen-1-yl)-N-(2-ethoxyethyl)-alpha-chloroacetamide |
| 67 | N-(2-methyl-6-ethyl-1-cyclohexen-1-yl)-N-(2-ethoxyethyl)-alpha-chloroacetamide |
| 68 | N-(3,4-dimethyl-1-cyclohexen-1-yl)-N-(2-ethoxyethyl)-alpha-chloroacetamide |
| 69 | N-(2-methyl-6-isopropyl-1-cyclohexen-1-yl)-N-(2-ethoxyethyl)-alpha-chloroacetamide |
| 70 | N-(2-isopropyl-1-cyclohexen-1-yl)-N-(2-ethoxyethyl)-alpha-chloroacetamide |
| 71 | N-(2,6-diethyl-1-cyclohexen-1-yl)-N-(2-ethoxyethyl)-alpha-chloroacetamide |
| 72 | N-(2,4-dimethyl-1-cyclohexen-1-yl)-N-(2-methoxyethyl)-alpha-chloroacetamide |
| 73 | N-(2-methyl-1-cyclohexen-1-yl)-N-(2-sec-butoxyethyl)-alpha-chloroacetamide |
| 74 | N-(4-isopropyl-1-cyclohexen-1-yl)-N-(2-ethoxyethyl)-alpha-chloroacetamide |
| 75 | N-(2,5-dimethyl-1-cyclohexen-1-yl)-N-(2-methoxyethyl)-alpha-chloroacetamide |
| 76 | N-(2,6-dimethyl-1-cyclohexen-1-yl)-N-(2-sec-butoxyethyl)-alpha-chloroacetamide |
| 77 | N-(2-methyl-1-cyclohexen-1-yl)-N-(2-propoxyethyl)-alpha-chloroacetamide |
| 78 | N-(2,6-dimethyl-1-cyclohexen-1-yl)-N-(2-propoxyethyl)-alpha-chloroacetamide |
| 79 | N-(3,5-dimethyl-1-cyclohexen-1-yl)-N-(2-propoxyethyl)-alpha-chloroacetamide |
| 80 | N-(2,4-dimethyl-1-cyclohexen-1-yl)-N-(2-sec-butoxyethyl)-alpha-chloroacetamide |
| 81 | N-(2-methyl-1-cyclohexen-1-yl)-N-(2-isopropoxyethyl)-alpha-chloroacetamide |
| 82 | N-(2-methyl-1-cyclohexen-1-yl)-N-(2-n-butoxyethyl)-alpha-chloroacetamide |
| 83 | N-(2,6-dimethyl-1-cyclohexen-1-yl)-N-(2-isopropoxyethyl)-alpha-chloroacetamide |
| 84 | N-(2,4-dimethyl-1-cyclohexen-1-yl)-N-(2-n-butoxyethyl)-alpha-chloroacetamide |
| 85 | N-(3,5-dimethyl-1-cyclohexen-1-yl)-N-(2-sec-butoxyethyl)-alpha-chloroacetamide |
| 86 | N-(2-ethyl-cyclohexen-1-yl)-N-(2-ethoxyethyl)-alpha-chloroacetamide |
| 87 | N-(2-ethyl-1-cyclohexen-1-yl)-N-(2-n-propoxyethyl)-alpha-chloroacetamide |
| 88 | N-(2-ethyl-1-cyclohexen-1-yl)-N-(2-sec-butoxyethyl)-alpha-chloroacetamide |
| 89 | N-(2,6-dimethyl-cyclohexen-1-yl)-(2,2-diethoxyethyl)-alpha-chloroacetamide |
| 90 | N-(2,6-dimethyl-1-cyclohexen-1-yl)-N-(2,2-dimethoxyethyl)-alpha-chloroacetamide |
| 91 | N-(2-n-propyl-1-cyclohexen-1-yl)-N-(2-ethoxyethyl)-alpha-chloroacetamide |
| 92 | N-(2,6-dimethyl-1-cyclohexen-1-yl)-N-(1-methyl-2-methoxyethyl)-alpha-chloroacetamide |
| 93 | N-(2-n-propyl-1-cyclohexen-1-yl)-N-(2-isopropoxyethyl)-alpha-chloroacetamide |
| 94 | N-(2-n-propyl-1-cyclohexen-1-yl)-N-(2-n-propoxyethyl)-alpha-chloroacetamide |
| 95 | N-(2-n-propyl-1-cyclohexen-1-yl)-N-(2-sec-butoxyethyl)-alpha-chloroacetamide |
| 96 | N-(2-n-propyl-1-cyclohexen-1-yl)-N-(2-n-butoxyethyl)-alpha-chloroacetamide |
| 97 | N-(2-n-propyl-1-cyclohexen-1-yl)-N-(2-methoxyethyl)-alpha-chloroacetamide |
| 98 | N-(2-n-propyl-1-cyclohexen-1-yl)-N-[2-(3-methoxy-n-butoxy)ethyl]-alpha-chloroacetamide |
| 99 | N-(2-methyl-1-cyclohexen-1-yl)-N-(1-methyl-2-methoxyethyl)-alpha-chloroacetamide |
| 100 | N-(2-methyl-1-cyclohexen-1-yl)-N-methyl-alpha-chloroacetamide |
| 101 | N-(2-methyl-1-cyclohexen-1-yl)-N-[2-(3-methoxy-n-butoxy)ethyl]-alpha-chloroacetamide |
| 102 | N-(2,6-dimethyl-1-cyclohexen-1-yl)-N-(2-n-butoxyethyl)-alpha-chloroacetamide |
| 103 | N-(2-methyl-6-n-propyl-1-cyclohexen-1-yl)-N-(2-n-butoxyethyl)-alpha-chloroacetamide |
| 104 | N-(2-methyl-6-n-propyl-1-cyclohexen-1-yl)-N-(2-n-butoxyethyl)-alpha-chloroacetamide |
| 105 | N-(2,6-dimethyl-1-cyclohexen-1-yl)-N-[2-(3-methoxy-n-butoxy)ethyl]-alpha-chloroacetamide |
| 106 | N-(2,5-dimethyl-1-cyclohexen-1-yl)-N-(2-sec-butoxy-ethyl)-alpha-chloroacetamide |
| 107 | N-(1-cyclohexen-1-yl)-N-(2-isopropoxyethyl)-alpha-chloroacetamide |
| 108 | N-(1-cyclohexen-1-yl)-N-(2-n-butoxyethyl)-alpha-chloroacetamide |
| 109 | N-(2-isobutyl-1-cyclohexen-1-yl)-N-(2-ethoxyethyl)-alpha-chloroacetamide |
| 110 | N-(3-methyl-1-cyclohexen-1-yl)-N-(2-methoxyethyl)-alpha-chloroacetamide |
| 111 | N-(4-methyl-1-cyclohexen-1-yl)-N-(2-methoxyethyl)-alpha-chloroacetamide |
| 112 | N-(2-isobutyl-1-cyclohexen-1-yl)-N-(2-methoxyethyl)-alpha-chloroacetamide |
| 113 | N-(2-methyl-6-n-propyl-1-cyclohexen-1-yl)-N-(2-methoxyethyl)-alpha-chloroacetamide |
| 114 | N-(2-methyl-6-ethyl-1-cyclohexen-1-yl)-N-(2-methoxy-ethyl)-alpha-chloroacetamide |
| 115 | N-(3,5-dimethyl-1-cyclohexen-1-yl)-N-isopropyl-alpha-chloroacetamide |
| 116 | N-(2,5-dimethyl-1-cyclohexen-1-yl)-N-(2-n-butoxyethyl)-alpha-chloroacetamide |
| 117 | N-(2,5-dimethyl-1-cyclohexen-1-yl)-N-isopropyl-alpha-chloroacetamide |
| 118 | N-(2-methyl-6-n-propyl-1-cyclohexen-1-yl)-N-(2-isopropoxyethyl)-alpha-chloroacetamide |
| 119 | N-(4-isopropyl-1-cyclohexen-1-yl)-N-n-propyl-alpha-chloroacetamide |
| 120 | N-(4-methyl-1-cyclohexen-1-yl)-N-n-propyl-alpha-chloroacetamide |
| 121 | N-(4-methyl-1-cyclohexen-1-yl)-N-(1-methyl-2-methoxyethyl)-alpha-chloroacetamide |
| 122 | N-(3-methyl-1-cyclohexen-1-yl)-N-(1-methyl-2-methoxyethyl)-alpha-chloroacetamide |
| 123 | N-(2-methyl-1-cyclohexen-1-yl)-N-(3-isopropoxy-n-propyl)-alpha-chloroacetamide |
| 124 | N-(2,6-dimethyl-1-cyclohexen-1-yl)-N-(3-isopropoxy-n-propyl)-alpha-chloroacetamide |
| 125 | N-(1-cyclohexen-1-yl)-N-(3-isopropoxy-n-propyl)-alpha-chloroacetamide |
| 126 | N-(4-isopropyl-1-cylohexen-1-yl)-N-methyl-alpha-chloroacetamide |
| 127 | N-(3,5-dimethyl-1-cyclohexen-1-yl)-N-methyl-alpha-chloroacetamide |
| 128 | N-(2-isopropyl-1-cyclohexen-1-yl)-N-allyl-alpha-chloroacetamide |
| 129 | N-(2-isopropyl-1-cyclohexen-1-yl)-N-(1-methyl-2-methoxyethyl)-alpha-chloroacetamide |
| 130 | N-(2-isobutyl-1-cyclohexen-1-yl)-N-(1-methyl-2-methoxyethyl)-alpha-chloroacetamide |
| 131 | N-(3,3,5-trimethyl-1-cyclohexen-1-yl)-N-(2-ethoxyethyl)-alpha-chloroacetamide |
| 132 | N-(2-ethyl-1-cyclohexen-1-yl)-N-(1-methyl-2-methoxyethyl)-alpha-chloroacetamide |
| 133 | N-(2-ethyl-1-cyclohexen-1-yl)-N-n-propyl-alpha-chloroacetamide |
| 134 | N-(2-n-propyl-1-cyclohexen-1-yl)-N-(1-methyl-2-methoxyethyl)-alpha-chloroacetamide |
| 135 | N-(2-n-propyl-1-cyclohexen-1-yl)-N-allyl-alpha-chloroacetamide |
| 136 | N-(2-n-propyl-1-cyclohexen-1-yl)-N-n-propyl-alpha-chloroacetamide |
| 137 | N-(2-n-propyl-1-cyclohexen-1-yl)-N-methyl-alpha-chloroacetamide |
| 138 | N-(2-methyl-1-cyclohexen-1-yl)-N-(2-methoxy-n-propyl)-alpha-chloroacetamide |
| 139 | N-(1-cyclopenten-1-yl) N-(2-propen-1-yl) alpha-chloroacetamide |
| 140 | N-(1,3-cyclohexadien-1-yl) N-(methyl) alpha-chloroacetamid |
| 141 | N-(3-methyl-1-cyclopenten-1-yl) N-(methyl) alpha-chloroacetamide |
| 142 | N-(3,4-dimethyl-1-cyclopenten-1-yl) N-(methyl) alpha-chloroacetamide |
| 143 | N-[5-(tert-butyl)-1-cyclopenten-1-yl] N-(isopropyl) alpha-chloroacetamide |
| 144 | N-(3-methyl-5-cyclopenten-1-yl) N-methyl alpha-chloroacetamide |
| 145 | N-(2,4,6-trimethyl-1-cyclohexen-1-yl) N-(isopropyl) alpha-chloroacetamide |
| 146 | N-[2,6-di(tert-bntyl)-1-cyclohexen-1-yl] N-(isopropyl) alpha-chloroacetamide |
| 147 | N-(6-methyl-1,3-cyclohexadien-1-yl) N-(isopropyl) alpha-chloroacetamide |
| 148 | N-(5-methyl-4,6-cyclohexadien-1-yl) N-(isopropyl) alpha-chloroacetamide |
| 149 | N-(3-methyl-4,6-cyclohexadien-1-yl) N-(isopropyl) alpha-chloroacetamide |
| 150 | N-(3,5-dimethyl-1,3-cyclohexadien-1-yl) N-(isopropyl) alpha-chloroacetamide |
| 151 | N-[2,6-di(tert-bntyl)-1,3-cyclohexadien-1-yl]-N-methyl alpha-chloroacetamide |
| 152 | N-(4-methyl-1,3-cyclohexadien-1-yl)-N-methyl alpha-chloroacetamide |
| 153 | N-(2,6-dimethyl-1,4-cyclohexadien-1-yl)-N-chloromethyl alpha-chloroacetamide |
| 154 | N-(6-tert-bntyl-1,4-cyclohexadien-1-yl)-N-2,4-dichlorobutyl alpha-chloroacetamide |
| 155 | N-(4-isopropyl-1,4-cyclohexadien-1-yl)-N-methyl alpha-chloroacetamide |
| 156 | N-(3,5-dimethyl-2,6-cyclohexadien-1-yl)-N-2-penten-1-yl alpha-chloroacetamide |
| 157 | N-(4,4-dimethyl-2,6-cyclohexadien-1-yl)-N-bromo-methyl alpha-chloroacetamide |
| 158 | N-(2,6-dimethyl-1-cyclohexen-1-yl)-N-ethoxyethyl alpha-chloroacetamide |
| 159 | N-(4-methyl-1-cyclohexen-1-yl)-N-ethoxyethyl alpha-chloroacetamide |
| 160 | N-(2,6-dibutyl-1-cyclohexen-1-yl)-N-ethoxyethyl alpha-chloroacetamide |
| 161 | N-(2,4,4-trimethyl-1,5-cyclohexadien-1-yl)-N-methyl alpha-chloroacetamide |

| Example | Compounds |
|---|---|
| 162 | N-(3-methyl-1-cyclohepten-1-yl) N-(isopropyl) alpha-chloroacetamide |
| 163 | N-(3,4-dimethyl-1-cyclohepten-1-yl) N-(isopropyl) alpha-chloroacetamide |
| 164 | N-(7-tert-bntyl-1-cyclohepten-1-yl) N-(isopropyl) alpha-chloroacetamide |
| 165 | N-(3,4-diisopropyl-1-cyclohepten-1-yl) N-(isopropyl) alpha-chloroacetamide |
| 166 | N-(6-methyl-7-cylohepten-1-yl) N-(isopropyl) alpha-chloroacetamide |
| 167 | N-(3,5-dimethyl-1-cyclohepten-1-yl) N-(isopropyl) alpha-chloroacetamide |
| 168 | N-(3,4-dichloro-1-cyclopenten-1-yl) alpha-chloroacetamide |
| 169 | N-(1-methoxy-1-cyclopenten-1-yl) alpha-chloroacetamide |
| 170 | N-(1-cyclopenten-1-yl) alpha-chloroacetamide |
| 171 | N-(3-methoxycyclohexen-1-yl) N-(isopropyl) alpha-chloroacetamide |
| 172 | N-(1-cyclohexen-1-yl) alpha-chloroacetamide |
| 173 | N-(2,4-dimethoxy-1-cyclohexen-1-yl) N-(phenyl) alpha-bromoacetamide |
| 174 | N-(2,4-dichloro-1-cyclohexen-1-yl) N-(methyl) alpha-bromoacetamide |
| 175 | N-(2,4-dibromo-1-cyclohexen-1-yl) N-(heptyl) alpha-bromoacetamide |
| 176 | N-(2-phenyl-1-cyclohexen-1-yl) N-(methoxybntyl) alpha-iodoacetamide |
| 177 | N-(2-t-butoxy-1-cyclohexen-1-yl) N-(2-buten-1-yl) alpha-iodoacetamide |
| 178 | N-(1-cyclopenten-1-yl) N-(n-butyl) alpha-bromoacetamide |
| 179 | N-(1-cyclopenten-1-yl) N-(2-propen-1-yl) alpha-bromoacetamide |
| 180 | N-(1,3-cyclohexadien-1-yl) alpha-chloroacetamide |
| 181 | N-(3-methyl-1-cyclopenten-1-yl) alpha-chloroacetamide |
| 182 | N-(3,4-dimethoxy-1-cyclopenten-1-yl) N-(methyl) alpha-bromoacetamide |
| 183 | N-(3,4-dimethoxy-5-cyclopenten-1-yl) N-(2-penten-1-yl) alpha-chloroacetamide |
| 184 | N-[5-(tert-butoxy)-1-cyclopenten-1-yl] N-(isopropyl) alpha-chloroacetamide |
| 185 | N-(3-chloro-5-cyclopenten-1-yl) N-methyl alpha-chloroacetamide |
| 186 | N-(3,4-diethoxy-1-cyclohexen-1-yl) N-(isopropyl) alpha-chloroacetamide |
| 187 | N-(5-methyl-1-cyclohexen-1-yl) alpha-chloroacetamide |
| 188 | N-(3,4-dibromo-6-cyclohexen-1-yl) N-(isopropyl) alpha-chloroacetamide |
| 189 | N-(1-cyclohexen-1-yl) N-(2,2-dimethoxyethyl) alpha-chloroacetamide |
| 190 | N-(1-cyclohexen-1-yl) N-(methoxybutoxyethyl) alpha-chloroacetamide |
| 191 | N-(6-cyclohexen-1-yl) N-(allyloxyethyl) alpha-chloroacetamide |
| 192 | N-(3-phenyl-6-cyclohexen-1-yl) N-methyl alpha-chloroacetamide |
| 193 | N-(6-methoxy-1,3-cyclohexadien-1-yl) N-(isopropyl) alpha-chloroacetamide |
| 194 | N-(5-methyl-4,6-cyclohexadien-1-yl) alpha-chloroacetamide |
| 195 | N-(3-chloro-4,6-cyclohexadien-1-yl) alpha-chloroacetamide |
| 196 | N-(3,5-dimethoxy-1,3-cyclohexadien-1-yl) alpha-chloroacetamide |
| 197 | N-[2,6-di(tert-butyl)-1,3-cyclohexadien-1-yl]-N-methyl alpha-bromoacetamide |
| 198 | N-(2-methyl-1,3-cyclohexadien-1-yl)-N-methyl alpha-iodoacetamide |
| 199 | N-(4-methyl-1,3-cyclohexadien-1-yl) alpha-chloroacetamide |
| 200 | N-(3,5-dibromo-1,4-cyclohexadien-1-yl)-N-4-allyloxy-ethoxy-4-ethoxybutyl alpha-chloroacetamide |
| 201 | N-(2,6-dibromo-1,4-cyclohexadien-1-yl)-N-cyclohexyl alpha-bromoacetamide |
| 202 | N-(3,3-dimethoxy-1,4-cyclohexadien-1-yl)-N-phenyl alpha-chloroacetamide |
| 203 | N-(6-phenyl-1,4-cyclohexadien-1-yl)-N-(benzyl) alpha-chloroacetamide |
| 204 | N-(2-methoxy-4-isopropyl-1,4-cyclohexadien-1-yl)-N-(2,4-dimethylphenyl) alpha-chloroacetamide |
| 205 | N-(2-methoxy-4-methyl-1,4-cyclohexadien-1-yl)-N-(isopropyl) alpha-chloroacetamide |
| 206 | N-(2-chloro-3-methyl-2,6-cyclohexadien-1-yl)-N-(methyl) alpha-chloroacetamide |
| 207 | N-(3,5-dimethyl-2,6-cyclohexadien-1-yl)-N-(4-butoxy-2-methoxybutyl) alpha-chloroacetamide |
| 208 | N-(2-chloro-4,4-dimethyl-2,6-cyclohexadien-1-yl)-N-(methyl) alpha-chloroacetamide |
| 209 | N-(6 tert-butyl-2,6-cyclohexadien-1-yl) alpha-chloroacetamide |
| 210 | N-(2,6-dimethyl-4-methoxy-2,6-cyclohexadien-1-yl) alpha-chloroacetamide |
| 211 | N-(2,4-dimethyl-2,6-cyclohexadien-1-yl)-N-(allyl) alpha-iodoacetamide |
| 212 | N-(3-methyl-1,5-cyclohexadien-1-yl) alpha-chloroacetamide |
| 213 | N-(3,4-dimethoxy-1,5-cyclohexadien-1-yl)-N-(methyl) alpha-chloroacetamide |
| 214 | N-(5-methyl-1,5-cyclohexadien-1-yl)-N-(4-methoxy-butoxyethyl) alpha-chloroacetamide |
| 215 | N-(4-methyl-1,5-cyclohexadien-1-yl)-N-(allyloxyethyl) alpha-chloroacetamide |
| 216 | N-(2,6-dimethyl-1,5-cyclohexadien-1-yl)-N-(2,2-diethoxyethyl) alpha-chloroacetamide |
| 217 | N-(2,4,4-trimethoxy-1,5-cyclohexadien-1-yl)-N-(methyl) alpha-chloroacetamide |
| 218 | N-(2-methoxy-3-methyl-3,6-cyclohexadien-1-yl)-N-(methyl) alpha-chloroacetamide |
| 219 | N-(2-methyl-3,6-cyclohexadien-1-yl) alpha-chloroacetamide |
| 220 | N-(2,5-dibromo-3,6-cyclohexadien-1-yl) alpha-chloroacetamide |
| 221 | N-(3-methyl-1-cyclohepten-1-yl) alpha-chloroacetamide |
| 222 | N-(3,4-dimethoxy-1-cyclohepten-1-yl) N-(4-methylcyclohexyl) alpha-chloroacetamide |
| 223 | N-(7-tert-butyl-1-cyclohepten-1-yl) N-(isopropyl) alpha-bromoacetamide |
| 224 | N-(3,4-dibromo-1-cyclohepten-1-yl) N-(4-methoxy-cyclohexyl) alpha-chloroacetamide |
| 225 | N-(2-methoxy-6-methyl-7-cyclohepten-1-yl) N-(isopropyl) alpha-chloroacetamide |
| 226 | N-(3,5-dichloro-1-cyclohepten-1-yl) N-(isopropyl) alpha-bromoacetamide |
| 227 | N-(1-cyclohexen-1-yl)-N-(4-n-butoxy-4-n-butoxy-4-n-butoxy-butyl)-alpha-chloroacetamide |
| 228 | N-(1-cyclohexen-1-yl)-N-(4-allyl-4-n-butoxy-4-n-butoxy-butyl)-alpha-chloroacetamide |
| 229 | N-(1-cyclohexen-1-yl)-N-(2-chlorodecyl)-alpha-chloroacetamide |
| 230 | N-(1-cyclohexen-1-yl)-N-(octene-2)-alpha-cholroacetamide |
| 231 | N-(1-cyclohexen-1-yl)-N-(2-amylcyclohexyl) alpha-chloroacetamide |

The pre-emergent herbicidal activity of illustrative N-(1-cycloalken-1-yl) alpha-haloacetamides of this invention is demonstrated as follows:

A good grade of top soil is placed in aluminum pans and compacted to a depth of ⅜″ to ½″ from the top of each pan. A predetermined number of seeds of each of various plant species are placed on top of the soil in separate pans. The plant growth regulant compositions are applied to the soil by two methods: (1) application to the surface of the top soil layer and (2) admixture with or incorporation in the top soil layer.

In the surface application method the seeds are covered with a ⅜″ layer of prepared soil and the pan leveled. The plant growth regulant composition is applied by spraying the surface of the top layer of soil, prior to watering the seeds, with a solution containing a sufficient amount of active ingredient to obtain the desired rate per acre on the soil surface.

In the soil incorporation method, the soil required to fill the pans is weighed and admixed with a plant growth regulant composition containing a known amount of active ingredient. The pans are then filled with the admixture and leveled. Watering is carried out by permitting the soil in the pans to absorb moisture through the apertured bottom of the pans. The seed containing pans are placed on a wet sand bench and maintained for approximately 14 days under ordinary conditions of sunlight and watering. The plants are observed at the end of approximately 14 days and the results recorded.

The pre-emergent herbicidal activity of the active ingredients is measured by the average percent control of each seed lot. The average percent control is converted to a relative numerical scale for the sake of brevity and simplicity in the examples. The pre-emergent herbicidal activity index used in Tables I, II and III is defined as follows:

| Average percent control | Numerical scale |
|---|---|
| 0–25 | 0 |
| 26–50 | 1 |
| 51–75 | 2 |
| 76–100 | 3 |

The pre-emergent herbicidal activity of some of the N-(cycloalken-1-yl) alpha-haloacetamides of this invention is recorded in Tables I and II for various application rates of the active ingredients in both surface and soil-incorporation applications. The terms "SA" and "SI" in the Application Method column of Tables I, II, and III mean surface application method and soil incorporation method, respectively. In Tables I, II and III the various plant species are represented by letters as follows:

A—Morning Glory
B—Wild Oats
C—Brome Grass
D—Rye Grass
E—Radish
F—Sugar Beets
G—Cotton
H—Corn
I—Foxtail
J—Barnyard Grass
K—Crab Grass
L—Pigweed
M—Soybean
N—Wild Buckwheat
O—Tomato
P—Sorghum
Q—Rice
R—Wheat
S—Smartweed
T—Cocklebur
U—Lambsquarter
V—Coffee Weed
W—Velvet Leaf TABLE I.—PRE-EMERGENT HERBICIDAL ACTIVITY OF VARIOUS N-(CYCLOALKEN-1-YL) ALPHA-HALOACETAMIDES

| Compound | Rate, lbs./acre | Application method | A | B | C | D | E | F | G | H | I | J | K | L | M | N | O | P | Q |
|---|---|---|---|---|---|---|---|---|---|---|---|---|---|---|---|---|---|---|---|
| N-(1-cyclohexen-1-yl)-N-isopropyl-alpha-chloroacetamide | 5 | SA | 2 | 3 | 3 | 3 | 1 | 3 | | | 3 | | 3 | 3 | 1 | 2 | 1 | 3 | |
| | 0.25 | SI | 0 | 3 | 3 | 3 | 0 | 0 | 0 | 0 | 3 | 3 | 3 | 3 | 0 | 0 | 0 | 3 | 3 |
| | 0.01 | SI | 0 | 0 | 0 | 1 | 0 | 0 | 0 | 0 | 3 | 3 | 3 | 1 | 0 | 0 | 0 | 0 | 0 |
| N-(1-cyclohexen-1-yl)-N-methyl-alpha-chloroacetamide | 5 | SA | 0 | 2 | 3 | 3 | 0 | 1 | | | 3 | | 3 | 3 | 1 | 0 | 1 | 3 | |
| | 0.25 | SI | 0 | 0 | 1 | 1 | 0 | 0 | 0 | 0 | 2 | 3 | 3 | 1 | 0 | 0 | 1 | 0 | 2 |
| N-(1-cyclohexen-1-yl)-N-ethyl-alpha-chloroacetamide | 5 | SA | 2 | 3 | 3 | 3 | 2 | 3 | | | 3 | | 3 | 3 | 1 | 2 | 1 | 3 | |
| | 0.25 | SI | 0 | 0 | 3 | 2 | 0 | 0 | 0 | 0 | 3 | 3 | 3 | 2 | 0 | | 0 | 0 | 0 |
| N-(1-cyclohexen-1-yl)-N-n-propyl-alpha-chloroacetamide | 5 | SA | 0 | 3 | 3 | 3 | 1 | 1 | | | 3 | | 3 | 3 | 1 | 1 | 0 | 3 | |
| | 0.05 | SI | 0 | 0 | 0 | 1 | 0 | 0 | 0 | 0 | 3 | 3 | 3 | 1 | 0 | 0 | 0 | 0 | 0 |
| N-(1-cyclohexen-1-yl)-N-isobutyl-alpha-chloroacetamide | 5 | SA | 0 | 3 | 3 | 3 | 0 | 1 | | | 3 | | 3 | 3 | 1 | 0 | 0 | 3 | |
| | 1 | SI | 2 | 1 | 2 | 2 | 2 | 1 | 0 | 1 | 3 | 3 | 3 | 3 | 1 | 0 | 1 | 2 | 3 |
| | 0.25 | SI | 0 | 1 | 0 | 1 | 0 | 0 | 0 | 0 | 3 | 3 | 2 | 1 | 0 | 0 | 1 | 0 | 2 |
| N-(1-cyclohexen-1-ly)-N-allyl-alpha-chloroacetamide | 10 | SA | 2 | 3 | 3 | 3 | 1 | 3 | | | 3 | | 3 | 3 | 1 | 3 | 3 | 3 | |
| | 1 | SI | 2 | 3 | 3 | 3 | 1 | 3 | 0 | 0 | 3 | 3 | 3 | 3 | 0 | 1 | 3 | 3 | 3 |
| | 0.05 | SI | 0 | 1 | 1 | 2 | 0 | 0 | 0 | 0 | 3 | 3 | 3 | 2 | 1 | 0 | 0 | 2 | 1 |
| N-(1-cyclohexen-1-yl)-N-ethoxy-ethyl-alpha-chloroacetamide | 10 | SA | 2 | 3 | 3 | 3 | 1 | 3 | | | 3 | | 3 | 3 | 0 | 3 | 2 | 3 | |
| | 1 | SI | 0 | 1 | 3 | 3 | 0 | 0 | 0 | 1 | 3 | 3 | 3 | 3 | 1 | 2 | 0 | 3 | 3 |
| N-(1-cyclohexen-1-yl)-N-methoxy-propyl-alpha-chloroacetamide | 5 | SA | 0 | 0 | 3 | 3 | 0 | 1 | | | 3 | | 3 | 3 | 0 | 0 | 0 | 3 | |
| | 1 | SI | 0 | 0 | 3 | 3 | 0 | 1 | 0 | 0 | 3 | 3 | 3 | 0 | 0 | 0 | 0 | 2 | 1 |
| N-(1-cyclohexen-1-yl)-N-methoxy-ethyl-alpha-chloroacetamide | 5 | SA | 1 | 2 | 3 | 3 | 1 | 3 | | | 3 | | 3 | 3 | 0 | 1 | 2 | 3 | |
| | 1 | SI | 0 | 0 | 1 | 3 | 0 | 0 | | | 3 | | 3 | 0 | 0 | 0 | 0 | 3 | |
| N-(1-cyclopenten-1-yl)-N-(isopropyl)-alpha-chloroacetamide | 5 | SA | 0 | 2 | 2 | 3 | 0 | 1 | | | 3 | | 3 | 3 | 2 | 0 | 0 | 3 | |
| | 1 | SI | 0 | 1 | 1 | 2 | 0 | 0 | | | 3 | | 3 | 0 | 1 | 0 | 0 | 1 | |
| | 0.25 | SI | 0 | 0 | 2 | 3 | 0 | 0 | 0 | 0 | 3 | 3 | 3 | 1 | 0 | 0 | 0 | 2 | 2 |
| N-(1-cyclohexen-1-yl)-N-(2-methoxy-isopropyl)-alpha-chloroacetamide | 5 | SA | 0 | 1 | 0 | 1 | 0 | 2 | | | 3 | | 3 | 3 | 0 | 2 | 1 | 3 | |
| | 1 | SI | 0 | 1 | 3 | 3 | 0 | 1 | 1 | 0 | 3 | 3 | 3 | 3 | 0 | 1 | 0 | 3 | 3 |
| | 0.25 | SI | | | 0 | 1 | | 2 | 0 | 0 | | 3 | 3 | 3 | 0 | | | | 2 |
| N-(1,3-cyclohexadien-1-yl)-N-(isopropyl) alpha-chloroacetamide | 10 | SA | 1 | 3 | 3 | 3 | 1 | 2 | | | 3 | | 3 | 3 | 3 | 1 | 1 | 3 | |
| | 5 | SI | 1 | 2 | 3 | 3 | 0 | 2 | 0 | 0 | 3 | 3 | 3 | 3 | 0 | 2 | 1 | 3 | 3 |
| | 0.25 | SI | 0 | 0 | 0 | 1 | 0 | 0 | 0 | 0 | 3 | 3 | 2 | 0 | 0 | 0 | 0 | 0 | 2 |
| N-(1-cyclohepten-1-yl)-N-(isopropyl) alpha-chloroacetamide | 5 | SA | 1 | 3 | 3 | 3 | 0 | 2 | | | 3 | | 3 | 3 | 0 | 3 | 0 | 3 | |
| | 0.05 | SI | | | 0 | 1 | | | 1 | 1 | 0 | | 3 | 3 | 1 | 0 | | | 1 |
| N-(2-methyl-6-cyclohexen-1-yl) N-methyl alpha-chloroacetamide | 5 | SA | 1 | 3 | 3 | 3 | 0 | 3 | | | 3 | | 3 | 3 | 0 | 3 | 2 | 2 | |
| | 1 | SI | 0 | 3 | 3 | 3 | 0 | 0 | 0 | 0 | 3 | 3 | 3 | 1 | 0 | 0 | 1 | 3 | 3 |

TABLE II.—PRE-EMERGENT HERBICIDAL ACTIVITY OF VARIOUS N-(cycloalken-1-yl) ALPHA-HALOACETAMIDES

| Compound | Rate, lbs./acre | Application method | B | C | F | G | H | J | K | L | M | Q | R | S | T | U | V | W |
|---|---|---|---|---|---|---|---|---|---|---|---|---|---|---|---|---|---|---|
| N-(2,6-dimethyl-1-cyclohexen-1-yl) N-(2-ethoxyethyl) alpha-bromoacetamide | 0.25 | SI | 0 | 1 | 0 | 0 | 0 | 3 | 3 | 1 | 0 | 0 | 0 | 0 | 0 | 0 | 0 | 0 |
| Admixture of N-(2,5-dimethyl-1-cyclohexen-1-yl) N-(2-ethoxyethyl) alpha-chloroacetamide and N-(3,6-dimethyl-1-cyclohexen-1-yl) N-(2-ethoxyethyl) alpha-chloroacetamide | 0.25 | SI | 1 | 3 | 0 | 0 | 1 | 3 | 3 | 3 | 1 | 3 | 1 | 2 | 0 | 3 | 0 | 0 |
| N-(2-ethyl-1-cyclohexen-1-yl) N-(2-methoxyethyl) alpha-chloroacetamide | 0.25 | SI | 3 | 3 | 2 | 0 | 0 | 3 | 3 | 3 | 0 | 2 | 2 | 3 | 0 | 2 | 2 | 0 |
| N-(2,6-dimethyl-1-cyclohexen-1-yl) N-(2-ethoxyethyl) alpha-chloroacetamide | 0.25 | SI | 3 | 3 | 2 | 0 | 3 | 3 | 3 | 3 | 0 | 3 | 3 | 3 | 0 | 3 | 2 | 1 |
| Admixture of N-(2-methyl-6-ethyl-1-cyclohexen-1-yl) N-(2-ethoxyethyl) alpha-chloroacetamide and N-(2-ethyl-6-methyl-1-cyclohexen-1-yl) N-(2-ethoxyethyl) alpha-chloroacetamide | 0.25 | SI | 3 | 3 | 2 | 0 | 2 | 3 | 3 | 3 | 0 | 3 | 3 | 3 | 0 | 3 | 1 | 1 |
| N-(2,6-dimethyl-1-cyclohexen-1-yl) N-(2,2-dimethoxyethyl) alpha-chloroacetamide | 0.25 | SI | 2 | 2 | 0 | 1 | 1 | 3 | 3 | 1 | 0 | 0 | 0 | 1 | 0 | 0 | 3 | 0 |
| N-(1-cyclohexen-1-yl) N-(2,2-diethoxyethyl) alpha-chloroacetamide | 1.0 | SI | 0 | 0 | 0 | 0 | 1 | 3 | 0 | 0 | 0 | 0 | 0 | 0 | 0 | 0 | 0 | 0 |
| N-(2-phenyl-1-cyclohexen-1-yl) N-(2-propen-1-yl) alpha-chloroacetamide | 1.0 | SA | 1 | 0 | 0 | 1 | 0 | 3 | 3 | 0 | 1 | 1 | 0 | 0 | 0 | 0 | 0 | 0 |
| N-(4-methyl-1-cyclohexen-1-yl) N-(2-propen-1-yl) alpha-chloroacetamide | 0.25 | SA | 2 | 2 | 0 | 0 | 0 | 3 | 3 | 0 | 0 | 1 | 0 | 0 | 0 | 0 | 0 | 0 |
| N-(2,6-dimethyl-1-cyclohexen-1-yl) alpha-chloroacetamide | 0.25 | SA | 0 | 0 | 0 | 0 | 0 | 0 | 1 | 0 | 0 | 0 | 0 | 0 | 3 | 0 | 0 | |
| N-(2-ethyl-1-cyclohexen-1-yl) N-(2-propen-1-yl) alpha-chloroacetamide | 0.25 | SA | 3 | 2 | 1 | 0 | 0 | 3 | 3 | 1 | 0 | 1 | 1 | 0 | 0 | 2 | 0 | 0 |
| N-(2-methyl-6-t-butyl-1-cyclohexen-1-yl) alpha-bromoacetamide | 1.0 | SA | 0 | 0 | 0 | 0 | 0 | 3 | 3 | 3 | 0 | 0 | 0 | 0 | 0 | 3 | 0 | 1 |
| N-(1-cyclohexen-1-yl) N-(benzyl) alpha-chloroacetamide | 1.0 | SA | 2 | 1 | 1 | 0 | 0 | 3 | 0 | 1 | 0 | 2 | 0 | 0 | 0 | 3 | 1 | 0 |
| N-(2-methoxy-4-methyl-1-cyclohexen-1-yl) N-(ethoxyethyl) alpha-chloroacetamide | 1.0 | SI | 1 | 0 | 1 | 0 | 1 | 3 | 3 | 0 | 0 | 0 | 0 | 2 | 0 | 1 | 0 | 0 |
| N-(2-isopropyl-1-cyclohexen-1-yl)-N-(2-ethoxyethyl)-alpha-chloroacetamide | 1.0 | SA | 3 | 3 | 1 | 0 | 2 | 3 | 3 | 3 | 1 | 3 | 3 | 1 | 0 | 2 | 1 | 1 |
| Admixture of N-(2-propyl-1-cyclohexen-1-yl)-N-(2-ethoxyethyl)-alpha-chloroacetamide and N-(6-propyl-1-cyclohexen-1-yl)-N-(2-ethoxyethyl)-alpha-chloroacetamide | 1.0 | SA | 3 | 3 | 1 | 1 | 1 | 3 | 3 | 3 | 0 | 3 | 2 | 2 | 0 | 3 | 0 | 0 |
| N-(2,6-dimethyl-1-cyclohexen-1-yl)-N-(1-methoxy-isopropyl)-alpha-chloroacetamide | 0.25 | SI | 3 | 3 | 0 | 0 | 0 | 3 | 3 | 3 | 0 | 0 | 0 | 1 | 0 | 0 | 0 | 0 |
| Admixture of N-(3-methyl-1-cyclohexen-1-yl)-N-isopropyl-alpha-chloroacetamide and N-(5-methyl-1-cyclohexen-1-yl)-N-isopropyl-alpha-chloroacetamide | 1 | SA | 3 | 3 | 3 | 1 | 0 | 3 | 3 | 3 | 0 | 3 | 3 | 3 | 2 | 3 | 2 | 0 |
| N-(2-methyl-1-cyclohexen-1-yl)-N-isopropyl-alpha-chloroacetamide | 1 | SA | 2 | 3 | 0 | 0 | 0 | 3 | 3 | 3 | 0 | 3 | 1 | 0 | 1 | 2 | 1 | 1 |
| N-(2,6-dimethyl-1-cyclohexen-1-yl)-N-ethyl-alpha-chloroacetamide | 1 | SA | 2 | 3 | 1 | | 0 | 3 | 3 | 1 | 0 | 1 | 1 | 3 | 1 | 1 | 0 | 0 |
| Admixture of N-(2,6-dimethyl-1-cyclohexen-1-yl)-N-(2-ethoxyethyl)-alpha-chloroacetamide and N-(5,6-dimethyl-1-cyclohexen-1-yl)-N-(2-ethoxyethyl)-alpha-chloroacetamide | 1 | SI | 3 | 3 | 2 | 2 | 3 | 3 | 3 | 3 | 1 | 1 | 3 | 3 | 2 | 0 | 2 | 1 | 0 |

TABLE II.—Continued

| Compound | Rate, lbs./acre | Application method | Plant A | B | C | D | E | F | G | H | I | J | K | L | M | N | O | P | Q |
|---|---|---|---|---|---|---|---|---|---|---|---|---|---|---|---|---|---|---|---|
| N-(2,6-dimethyl-1-cyclohexen-1-yl)-N-methyl-alpha-chloroacetamide. | 1 | SA | 2 | 2 | 1 | 0 | 0 | 3 | 3 | 2 | 0 | 3 | 2 | 0 | 1 | 2 | 0 | 0 | |
| Admixture of N-(2-methyl-1-cyclohexen-1-yl)-N-2-isopropoxyethyl-alpha-chloroacetamide and N-(6-methyl-1-cyclohexen-1-yl)-N-2-isopropoxyethyl-alpha-chloroacetamide. | 1 | SI | 3 | 3 | 2 | 1 | 2 | 3 | 3 | 3 | 2 | 3 | 3 | 2 | 0 | 3 | 1 | 1 | |
| Admixture of N-(2-methyl-1-cyclohexen-1-yl)-N-2-propoxymethyl-alpha-chloroacetamide and N-(6-methyl-1-cyclohexen-1-yl)-N-2-propoxymethyl-alpha-chloroacetamide. | 1 | SA | 3 | 3 | 2 | 2 | 2 | 3 | 3 | 3 | 1 | 3 | 3 | 3 | 0 | 1 | 3 | 2 | |
| N-(2-isopropyl-1-cyclohexen-1-yl)-N-2-methoxyethyl-alpha-chloroacetamide. | 1 | SI | 3 | 3 | 2 | 2 | 2 | 3 | 3 | 3 | 0 | 3 | 3 | 3 | 0 | 3 | 2 | 0 | |
| Admixture of N-(2-methyl-6-propyl-1-cyclohexen-1-yl)-N-2-propoxyethyl-alpha-chloroacetamide and N-(2-propyl-6-methyl-1-cyclohexen-1-yl)-N-2-propoxyethyl-alpha-chloroacetamide. | 1 | SI | 3 | 3 | 1 | 1 | 2 | 3 | 3 | 3 | 1 | 2 | 2 | 1 | 0 | 1 | 0 | 0 | |

The lack of herbicidal activity of alpha-haloacetamides which are similar to the N-(cycloalken-1-yl) alpha-haloacetamides of this invention is demonstrated as follows. Pre-emergent greenhouse tests are used and the seed planting procedure and application of alpha-haloacetamide are carried out in the same manner as in the above pre-emergent examples. Results and further details are given in Table III. The identification of seeds, the herbicidal activity index and application method symbols are the same as those used above.

| Average percent control | Numerical scale |
|---|---|
| 0–25 | 0 |
| 26–50 | 1 |
| 51–75 | 2 |
| 76–99 | 3 |
| 100 | 4 |

The identification of the plants used is the same as in

TABLE III.—PRE-EMERGENT HERBICIDAL ACTIVITY OF ALPHA-HALOACETAMIDES

| Compound | Rate, lbs./acre | Application method | Plant A | B | C | D | E | F | G | H | I | J | K | L | M | N | O | P | Q |
|---|---|---|---|---|---|---|---|---|---|---|---|---|---|---|---|---|---|---|---|
| N-(2-cyclohexen-1-yl)-N-isopropyl-alpha-chloroacetamide | 1 | SI | 0 | 0 | 0 | 0 | 1 | 1 | 0 | 0 | 2 | 3 | 1 | 0 | 0 | 2 | 1 | 0 | 0 |
| | 0.25 | SI | 0 | 0 | 0 | 0 | 0 | 0 | 0 | 0 | 2 | 0 | 2 | 0 | 0 | 1 | 0 | 0 | |
| N-cyclohexyl-N-(2-methylpropenyl)acetamide | 5 | SA | 0 | 1 | 1 | 2 | 0 | 0 | | | 3 | | 3 | 3 | 0 | 0 | 0 | 1 | |
| | 1 | SI | 0 | 0 | 0 | 1 | 0 | 0 | 0 | 0 | 2 | 2 | 2 | 1 | 0 | 0 | 0 | 0 | 1 |

The post-emergent herbicidal activity of various N-(cycloalken-1-yl) alpha-haloacetamides of this invention the preceding pre-emergent tests. Results and further details are given in Table IV.

TABLE IV.—POST-EMERGENT HERBICIDAL ACTIVITY OF VARIOUS N-(CYCLOHEXEN-1-YL) ALPHA-HALOACETAMIDES

| Compound | Observation period | Plant A | B | C | D | E | F | G | H | I | J | K | L | M |
|---|---|---|---|---|---|---|---|---|---|---|---|---|---|---|
| N-(1-cyclohexen-1-yl)-N-allyl-alpha-chloroacetamide | (1) | 4 | 3 | 3 | 3 | 3 | 4 | 4 | 4 | 4 | 1 | 4 | 4 | 2 |
| N-(1-cyclohexen-1-yl)-N-isobutyl-alpha-chloroacetamide | (1) | 2 | 1 | 2 | 3 | 4 | 3 | 4 | 4 | 3 | 1 | 3 | 4 | 3 |
| N-(1-cyclohexen-1-yl)-N-(ethyl) alpha-chloroacetamide | (1) | 1 | 3 | 3 | 3 | 1 | 0 | 4 | 3 | 4 | 1 | 1 | 4 | 2 |
| N-(2,6-dimethyl-1-cyclohexen-1-yl) N-(2-isopropoxyethyl) alpha-chloroacetamide | (1) | 1 | 3 | 3 | 3 | 3 | 2 | 3 | 3 | 3 |  | 2 | 2 | 3 |
| N-(2,4-dimethyl-1-cyclohexen-1-yl) N-(2-n-propoxyethyl) alpha-chloroacetamide | (2) | 2 | 1 | 2 | 3 | 1 | 1 | 3 | 3 | 4 |  | 1 | 2 | 3 |
| N-(3,5-dimethyl-1-cyclohexen-1-yl) N-(2-isobutoxyethyl) alpha-chloroacetamide | (2) | 2 | 1 | 1 | 1 | 1 | 2 | 2 | 2 | 4 |  | 2 | 2 | 2 |
| Admixture of about 86.5 wt. percent N-(2-ethyl-1-cyclohexen-1-yl) N-(2-n-propoxyethyl) alpha-chloroacetamide and 13.5 wt. percent N-(2-ethyl-6-cyclohexen-1-yl) N-(2-n-propoxyethyl) alpha-chloroacetamide. | (1) | 2 | 3 | 3 | 3 | 2 | 3 | 3 | 3 | 3 | 2 | 3 | 2 | 1 |
| Admixture of about 78 wt. percent N-(2-n-propyl-1-cyclohexen-1-yl) N-(ethoxyethyl) alpha-chloroacetamide and 22 wt. percent N-(2-n-propyl-6-cyclohexen-1-yl) N-(2-ethoxyethyl) alpha-chloroacetamide. | (2) | 3 | 3 | 2 | 1 | 0 | 3 | 3 | 4 | 1 | 4 | 1 | 4 | |
| Admixture of about 82 wt. percent N-(2-n-propyl-1-cyclohexen-1-yl) N-(methoxyethyl) alpha-chloroacetamide and 18 wt. percent N-(2-n-propyl-6-cyclohexen-1-yl) N-(2-methoxyethyl) alpha-chloroacetamide. | (2) | 2 | 3 | 3 | 3 | 0 | 0 | 3 | 3 | 4 | 0 | 0 | 0 | 3 |
| N-(2-methyl-1-cyclohexen-1-yl) N-(2-methoxyisopropyl) alpha-chloroacetamide | (2) | 2 | 1 | 2 | 3 | 0 | 1 | 3 | 3 | 0 | 0 | 3 | 0 | 3 |

[1] 2 week observation period. [2] 4 week observation period.

is demonstrated as follows. The active ingredients are applied in spray form to 21-day old specimens of many of the same plants used in the preceding pre-emergent tests. The spray is an acetone-water solution containing 0.5% active ingredient. The solution is applied to the plants in different sets of pans at a rate equal to approximately 10 pounds of active ingredient per acre. The treated plants are placed in a greenhouse and the effects are observed and recorded after approximately 14 days or approximately 28 days, as is indicated in Table IV.

The post-emergent herbicidal activity index used in Table IV is measured by the average percent control of each plant species and is defined as follows:

The aquatic plant herbicidal activity of illustrative N-(1-cycloalken-1-yl) alpha-haloacetamides of this invention is demonstrated as follows: alpha-chloro-N-(2,6-dimethyl-1 - cyclohexen - 1 - yl) - N - (2 - ethoxyethyl) acetamide (Compound I) and alpha-chloro-N-(2 - ethoxyethyl)-N-(2,6 - n - propyl - 1 - cyclohexen-1-yl) acetamide (Compound II) were added to different vessels containing aqueous inorganic nutrient media and Duckweed (Spirodela). Each active ingredient was used at a concentration of 100 p.p.m. based on the aqueous nutrient media. After 48 hours the treated Duckweed was observed and the results recorded. Untreated Duckweed remained healthy and continued to grow during the tests. The herbicidal activity index used in Table V is defined as in the above post-emergent tests.

TABLE V.—AQUATIC PLANT HERBICIDAL ACTIVITY

| | Herbicidal activity |
|---|---|
| Compound I | 2 |
| Compound II | 4 |

As mentioned hereinbefore the herbicidal compositions of this invention comprise an active ingredient and one or more adjuvants which can be solid or liquid extenders, carriers, diluents, conditioning agents and the like. Preferred herbicidal compositions containing the active ingredients of this invention have been developed so that the active ingredients can be used to the greatest advantage to inhibit the growth of plants. The preferred compositions comprise wettable powders, aqueous suspensions, dust formulations granules, emulsifiable oils and solutions in solvents. In general, these preferred compositions can all contain one or more surface-active agents.

Surface-active agents which can be used in the herbicidal compositions of this invention are set out, for example, in Searle U.S. Pat. 2,426,417, Todd U.S. Pat. 2,655,447, Jones U.S. Pat. 2,412,510 and Lenher U.S. Pat. 2,139,276. A detailed list of such agents is also set forth by J. W. McCutcheon in "Soap and Chemical Specialties," November 1947, p. 8011 et seq., entitled "Synthetic Detergents"; "Detergents and Emulsifiers—Up to Date" (1960), by J. W. McCutcheon, Inc., and Bulletin E–607 of the Bureau of Entomology and Plant Quarantine of the U.S.D.A. In general, less than 50 parts by weight of the surface active agent is present per 100 parts by weight of herbicidal compositions.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isothionate, esters of sodium sulfosuccinate, sulfated or sulfonated fatty acid esters, petroleum sulfonates, sulfonated vegetable oils, ditertiary acetylinic glycols, polyoxyethylene derivatives of alkylphenols (particularly isooctylphenol and nonylphenol) and polyoxyethylene derivatives of the mono-higher fatty acid esters of hexitol anhydrides (e.g. sorbitan). Preferred dispersants are methyl cellulose, polyvinyl alcohol, sodium lignin sulfonates, polymeric alkyl naphthalene sulfonates, sodium naphthalene sulfonate, poly-methylene bisnaphthalenesulfonate and sodium N-methyl-N-(long chain acid) taurates.

The wettable powder compositions of this invention usually contain from about 5 to about 95 parts by weight of active ingredient, from about 0.25 to 25 parts by weight of wetting agent, from about 0.25 to 25 parts by weight of dispersant and from 4.5 to about 94.5 parts by weight of inert solid extender, all parts being by weight of the total composition. Where required from about 0.1 to 2.0 parts by weight of the solid inert extender can be replaced by a corrosion inhibitor or antifoaming agent or both.

Aqueous suspensions can be prepared by mixing together and grinding an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed coverage is very uniform.

Dusts are dense finely divided particulate compositions which are intended for application to the soil in dry form. Dusts are characterized by their free-flowing and rapid settling properties so that they are not readily wind-borne to areas where they are of no value. Dusts contain primarily an active ingredient and a dense, free-flowing finely divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be either of vegetable or mineral origin. The solid extenders are characterized by possessing relatively low surface areas and are poor in liquid absorption. Suitable inert solid extenders for herbicidal dusts include micaceous talcs, pyrophyllite, dense kaolin clays, ground calcium phosphate rock and tobacco dust. The dusts usually contain from about 0.5 to 95 parts active ingredient, 0 to 50 parts grinding aid, 0 to 50 parts wetting agent and 5 to 99.5 parts dense solid extender, all parts being by weight and based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and antifoam agents may also be found as components of a dust.

Emulsifiable oils are usually solutions of active ingredient in water-immiscible or partially water-immiscible solvents together with a surface active agent. Suitable solvents for the active ingredient of this invention include hydrocarbons and water-immiscible ethers, esters or ketones. Suitable surface active agents are anionic, cationic and nonionic such as alkyl aryl polyethoxy alcohols, polyethylene sorbitol or sorbitan fatty acid esters, polyethylene glycol fatty esters, fatty alkyllol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 50 parts surface active agent and about 4 to 94 parts solvent, all parts being by weight based on the total weight of emulsifiable oil.

Granules are physically stable particulate compositions comprising active ingredient adhering to or distributed through a basic matrix of an inert, finely-divided particulate extender. In order to aid leaching of the active ingredient from the particulate, a surface active agent such as those listed hereinbefore under wettable powders can be present in the composition. Natural clays, pyrophyllites, illite and vermiculite are examples of operable classes of particulate mineral extenders. The preferred extenders are the porous, absorptive, preformed particles such as preformed and screened particulate attapulgite or heat expanded, particulate vermiculite, and the finely-divided clays such as kaolin clays, hydrated attapulgite or bentonitic clays. These extenders are sprayed or blended with the active ingredient to form the herbicidal granules.

The mineral particles which are used in the granular herbicidal compositions of this invention usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent between 20 and 40 mesh is particularly preferred for use in the present granular compositions. The term "mesh" as used herein means U.S. Sieve Series.

The granular herbicidal compositions of the invention generally contain from about 5 parts to about 30 parts by weight of N-(cycloalken-1-yl) alpha-haloacetamide per 100 parts by weight of clay and 0 to about 5 parts by weight of surface active agent per 100 parts by weight of particulate clay. The preferred herbicidal granular compositions contain from about 10 parts to about 25 parts by weight of active ingredient per 100 parts by weight of clay.

The herbicidal compositions of this invention can also contain other additaments, for example fertilizers, phytotoxicants, other herbicides, pesticides and the like used as adjuvant or in combination with any of the above-described adjuvants. Chemicals useful in combination with the active ingredients of this invention include for example triazines, ureas, carbamates, acetamides, acetanilides, uracils, acetic acids, phenols, thiolcarbamates, triazoles, benzoic acids, nitriles and the like such as:

3-amino-2,5-dichloroebnzoic acid
3-amino-1,2,4-triazole
2-methoxy-4-ethylamino-6-isopropylamino-s-triazine
2-chloro-4-ethylamino-6-isopropylamino-s-triazine
2-chloro-N,N-diallylacetamide
2-chloroallyl diethyldithiocarbamate
N'-(4-chlorophenoxy) phenyl-N,N-dimethylurea
isopropyl N-(3-chlorophenyl)carbamate
2,2-dichloropropionic acid
S-2,3-dichloroallyl N,N-diisopropylthiolcarbamate
2-methoxy-3,6-dichlorobenzoic acid
2,6-dichlorobenzonitrile
N,N-dimethyl-2,2-diphenylacetamide
6,7-dihydrodipyrido(1,2-a:2',1'-c)-pyrazidinium salt
3-(3,4-dichlorophenyl)-1,1-dimethylurea
4,6-dinitro-o-sec-butylphenol
2-methyl-4,6-dinitrophenol
ethyl N,N-dipropylthiolcarbamate
2,3,6-trichlorophenylacetic acid
5-bromo-3-isopropyl-6-methyluracil
3-(3,4-dichlorophenyl)-1-methoxy-1-methylurea
2-methyl-4-chlorophenoxyacetic acid
3-(p-chlorophenyl)-1,1-dimethylurea
1-butyl-3-(3,4-dichlorophenyl)-1-methylurea
N-1-naphthylphthalamic acid
1,1'-dimethyl-4,4'-bipyridinium salt
2-chloro-4,6-bis(isopropylamino)-s-triazine
2-chloro-4,6-bis(ethylamino)-s-triazine
2,4-dichlorophenyl-4-nitrophenyl ether
alpha,alpha,alpha-trifluoro-2,6-dinitro-N,N-dipropyl-p-toluidine
S-propyl dipropylthiolcarbamate
2,4-dichlorophenoxyacetic acid
N-isopropyl-2-chloroacetanilide Fertilizers useful in combination with the active ingredients include for example ammonium nitrate, urea, potash, and superphosphate. Other useful additaments include materials in which plant organisms take root and grow such as compost, manure, humus, sand and the like.

When operating in accordance with the present invention, effective amounts of the N-(1-cycloalken-1-yl) alpha-halo-acetamides are dispersed in or on soil or plant growth media and/or applied to above ground portions of plants, or are incorporated into aquatic media in any convenient fashion. Application to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid herbicidal compositions to the surface of soil or to above ground portions of plants can be carried out by conventional methods, e.g. power dusters, boom and hand sprayers and spray dusters. The compositions can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the herbicide. The application of herbicidal compositions to aquatic plants is usually carried out by adding the compositions to the aquatic media in the area where control of the aquatic plants is desired.

The application of an effective amount of the N-(cycloalken-1-yl) alpha-haloacetamides of this invention to the soil or growth media and/or plant is essential and critical for the practice of one embodiment of the present invention. The exact amount of active ingredient to be employed is dependent upon the response desired in the plant as well as such other factors as the plant species and stage of development thereof, the specific soil and depth at which the active ingredients are distributed in the soil and the amount of rainfall as well as the specific N-(cycloalken-1-yl) alpha-haloacetamide employed. In foliar treatment for the modification of vegetative growth, the active ingredients are applied in amounts from about 1 to about 50 or more pounds per acre. In applications to soil for the modification of the growth of germinant seeds, germinative seeds, emerging seedlings and established vegetation, the active ingredients are applied in amounts from about 0.001 to about 25 or more pounds per acre. In such soil applications, it is desirable that the active ingredients be distributed to a depth of at least 0.2 inch. In selective pre-emergence herbicidal applications the active ingredients are usually applied in amounts from about 0.001 to 5 pounds per acre. In applications for the control of aquatic plants, the active ingredients are applied in amounts from about 0.01 part per million to about 1000 parts per million, based on the aquatic medium. It is believed that one skilled in the art can readily determine from the teachings of this specification, including examples, the approximate application rate.

The terms "soil" and "growth media" are employed in the present specification and claims in their broadest sense to be inclusive of all conventional "soils" as defined in Webster's New International Dictionary, Second Edition, Unabridged (1961). Thus, the terms refer to any substance or media in which vegetation may take root and grow, and are intended to include not only earth but also compost, manure, muck, humus, sand and the like, adapted to support plant growth.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A herbicidal composition comprising a herbicidal effective amount of one or more compounds of the formula

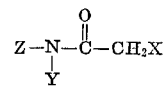

wherein
X is halogen;
Z is selected from the group consisting of
(I) hydrogen
(II) $X_n^1R$ wherein R is selected from the group consisting of alkyl having a maximum of 10 carbon atoms and alkenyl having a maximum of 8 carbon atoms, $X^1$ is halogen and $n$ is an integer from 0 to 2 inclusive,
(III) cycloalkyl, alkylcycloalkyl and alkoxycycloalkyl of at least 3 and not more than 8 ring carbon atoms, and not more than 5 chain carbon atoms, (IV) $R^3O[R^2O]_mR^1$—wherein $R^1$ is selected from the group consisting of alkylene of not more than 4 carbon atoms and alkoxyalkylene of not more than 8 carbon atoms, $R^2$ is alkylene of not more than 4 carbon atoms, $R^3$ is selected from the group consisting of alkyl and alkenyl of not more than 4 carbon atoms and $m$ is an integer from 0 to 1, and (V) phenyl, alkyl substituted phenyl, and phenylalkyl having a maximum of 8 carbon atoms; and Y is cycloalkenyl of at least 5 and not more than 7 carbon atoms in the ring selected from the group consisting of

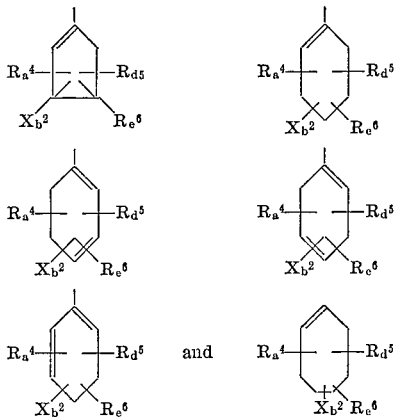

wherein $R^4$ is alkyl of not more than 4 carbon atoms; $R^5$ is alkoxy of not more than 4 carbon atoms; $R^6$ is phenyl, $X^2$ is halogen; $a$, $b$ and $d$ are each integers from 0 to 3, inclusive, $e$ is an integer from 0 to 1 and the sum of $a$, $b$, $d$ and $e$ is not more than 3.

2. A herbicidal composition in accordance with claim 1 wherein X is selected from the group consisting of chlorine, bromine and iodine; $X^1$ is selected from the group consisting of chlorine, bromine and iodine; $n$ is an integer of 0 to 1; and $b$ and $e$ are both zero.

3. A herbicidal composition in accordance with claim 2 wherein Z is selected from the group consisting of $X_n^1R$, wherein $n$ is the integer 0, and $R^3O-[R^2O]_m-R-$, and $d$ is zero.

4. A herbicidal composition according to claim 3 wherein the herbicidal effective compound is a mixture of N-(2,3-dimethyl-1-cyclohexen-1-yl)-N - (2 - ethoxethyl)-alpha-chloroacetamide and N-(5,6-dimethyl - 1 - cyclohexen-1-yl)-N-(2-ethoxyethyl)alpha-chloroacetamide.

5. A herbicidal composition according to claim 3 wherein the herbicidal effective compound is N-(2,6-dimethyl-1-cyclohexen-1-yl)-N-methyl-alpha-chloroacetamide.

6. A herbicidal composition according to claim 3 wherein the herbicidal effective compound is a mixture of N-(2-methyl-1-cyclohexen-1-yl) - N - (2 - isopropoxyethyl)-alpha-chloroacetamide and N-(6-methyl-1-cyclohexen-1-yl)-N-(2-isopropoxyethyl)-alpha-chloroacetamide.

7. A herbicidal composition according to claim 3 wherein the herbicidal effective compound is a mixture of N-(2-methyl-1-cyclohexen-1-yl)-N-(2 - propoxyethyl) - alpha-chloroacetamide and N-(6-methyl-1-cyclohexen-1 - yl)-cyclohexen-1-yl)-N-ethylacetamide.

8. A herbicidal composition according to claim 3 wherein the herbicidal effective compound is N-(2,6-dimethyl-1-cyclohexene-1-yl)-N-ethylacetamide.

9. A herbicidal composition according to claim 3 wherein the herbicidal effective compound is N-(2-methyl-1-cyclohexen-1-yl)-N-isopropyl-alpha-chloroacetamide.

10. A herbicidal composition according to claim 3 wherein the herbicidal effective compound is N-(2,6-dimethyl-1-cyclohexen-1-yl)-N-(2-n - butoxyethyl) - alpha-chloroacetamide.

11. A herbicidal composition according to claim 3 wherein the herbicidal effective compound is N-(2,6-dimethyl-1-cyclohexen-1-yl) - N - (1 - methoxyisopropyl)-alpha-chloroacetamide.

12. A herbicidal composition according to claim 3 wherein the herbicidal effective compound is N-(2-propyl-1-cyclohexen-1-yl)-N-2-ethoxyethyl - alpha - chloroacetamide.

13. A herbicidal composition according to claim 3 wherein the herbicidal effective compound is N-(2-isopropyl-1-cyclohexen-1-yl)-N-(2 - ethoxyethyl) - alpha-chloroacetamide.

14. A herbicidal composition according to claim 3 wherein the herbicidal effective compound is a mixture of N-(3-methyl-1-cyclohexen-1-yl) - N - isopropyl - alpha-chloro-acetamide and N-(5-methyl-1-cyclohexen-1-yl)-N-isopropyl-alpha-chloroacetamide.

15. A herbicidal composition according to claim 3 wherein the herbicidal effective compound is N-(2-isopropyl-1-cyclohexen-1-yl)-N-2 - methoxyethyl) - alpha-chloroacetamide.

16. A herbicidal composition according to claim 3 wherein the herbicidal effective compound is a mixture of N-(2-methyl-6-propyl-1-cyclohexen-1-yl) - N - (2 - propoxyethyl-alpha-chloroacetamide and N-(2 - propyl - 6-methyl-1-cyclohexene-1-yl)-N-2 - propoxyethyl) - alpha-chloroacetamide.

17. A herbicidal composition according to claim 3 wherein the herbicidal effective compound is a mixture of N-(2-methyl-6-ethyl-1-cyclohexen-1-yl)-N - (2 - ethoxyethyl)-alpha-chloroacetamide and N-(2 - propyl - 6-methyl-1-cyclohexen-1-yl)-N-(2 - propoxyethyl) - alpha-chloroacetamide.

18. A herbicidal composition according to claim 3 wherein the herbicidal effective compound is a mixture of N-(2,5-dimethyl-1-cyclohexen-1-yl)-N - (2 - ethoxyethyl)-alpha-chloro-acetamide and N-(3,6-dimethyl - 1-cyclohexen-1-yl)-N-(2-ethoxyethyl) - alpha - chloroacetamide.

19. A herbicidal composition in accordance with claim 3 in which $a$ is a maximum of two and each $R^4$ is alike or unlike.

20. A herbicidal composition according to claim 3 wherein the herbicidal effective compound is N-(2,6-dimethyl-1-cyclohexen-1-yl)-N-(2-ethoxyethyl) - 2 - chloroacetamide.

21. A herbicidal composition according to claim 3 wherein the herbicidal effective compound is an admixture of N-(2-methyl-6-n-propyl-1-cyclohexen-1-yl) - N - (2-ethoxyethyl)-2-chloroacetamide and N-(2-n-propyl - 6-methyl-1-cyclohexen-1-yl)-N-(2-ethoxyethyl)-2 - chloroacetamide.

22. A herbicidal composition according to claim 3 wherein the herbicidal effective compound is N-(2-methyl-1-cyclohexen-1-yl)-N-(2-methoxyethyl) - 2 - chloroacetamide.

23. A herbicidal composition according to claim 3 wherein the herbicidal effective compound is N-(2,6-dimethyl-1-cyclohexen-1-yl)-N-(2 - isopropoxyethyl) - 2-chloroacetamide.

24. A herbicidal composition in accordance with claim 3 in which the herbicidal effective compound is an admixture of N-(2-ethyl-1-cyclohexen-1-yl)-N-(2 - ethoxyethyl)-2-chloroacetamide and N-(6-ethyl-1-cyclohexen-1-yl)-N-(2-ethoxyethyl)-2-chloroacetamide.

25. A herbicidal composition in accordance with claim 3 in which the herbicidal effective compound is an admixture of N-(2-methyl-6-n-propyl-1-cyclohexen-1 - yl)-N-(2-methoxyethyl)-2-chloroacetamide and N - (2 - n-propyl-6-methyl-1-cyclohexene-1-yl)-N - (2 - methoxyethyl)-2-chloroacetamide.

26. A herbicidal method for inhibiting the growth of plants comprising contacting the plants with a herbicidal effective amount of one or more compounds of the formula

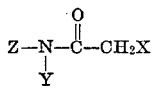

wherein

X is halogen;

Z is selected from the group consisting of
  (I) hydrogen
  (II) $X^1_n R$ wherein R is selected from the group consisting of alkyl having a maximum of 10 carbon atoms, and alkenyl having a maximum of 8 carbon atoms, $X^1$ is halogen and $n$ is an integer from 0 to 2 inclusive,
  (III) cycloalkyl, alkylcycloalkyl and alkoxycycloalkyl of at least 3 and not more than 8 ring carbon atoms, and not more than 5 chain carbon atoms,
  (IV) $R^3O[R^2O]_m R^1$ wherein $R^1$ is selected from the group consisting of alkylene of not more than 4 carbon atoms and alkoxyalkylene of not more than 8 carbon atoms, $R^2$ is alkylene of not more than 4 carbon atoms, $R^3$ is selected from the group consisting of alkyl and alkenyl of not more than 4 carbon atoms and $m$ is an integer from 0 to 1, and
  (V) phenyl, alkyl substituted phenyl, and phenylalkyl having a maximum of 8 carbon atoms; and Y is cycloalkenyl of at least 5 and not more than 7 carbon atoms in the ring selected from the group consisting of

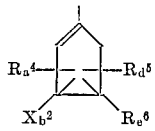 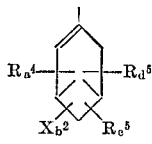

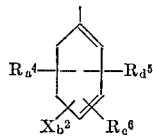 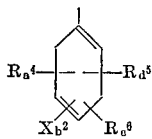

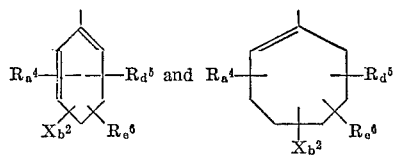

wherein $R^4$ is alkyl of not more than 4 carbon atoms; $R^5$ is alkoxy of not more than 4 carbon atoms; $R^6$ is phenyl, $X^2$ is halogen; $a$, $b$ and $d$ are each integers from 0 to 3, inclusive, $e$ is an integer from 0 to 1 and the sum of $a$, $b$, $d$ and $e$ is not more than 3.

27. A herbicidal method in accordance with claim 26 in which X is selected from the group consisting of chlorine, bromine and iodine; $X^1$ is selected from the group consisting of chlorine, bromine and iodine; $n$ is an integer from 0 to 1; and $b$ and $e$ are both zero.

28. A herbicidal method in accordance with claim 27 in which Z is selected from the group consisting of $X^1_n R$, wherein n is the integer 0, and

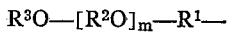

and $d$ is zero.

29. A herbicidal method in accordance with claim 28 in which $a$ is a maximum of two and each $R^4$ is alike or unlike.

References Cited
UNITED STATES PATENTS
3,268,324  8/1966  Hamm et al. _____ 71—118
3,141,758  7/1964  Hamm et al. _____ 71—118

FOREIGN PATENTS
923,128  4/1963  Great Britain _____ 71—118

LEWIS GOTTS, Primary Examiner

C. L. MILLS, Assistant Examiner

U.S. Cl. X.R.

71—66, 67, 88, 92, 93, 94, 100, 101, 105, 111, 113, 115, 116; 260—561, 562; 424—320, 324

UNITED STATES PATENT OFFICE
CERTIFICATE OF CORRECTION

Patent No. 3,586,496              Dated June 22, 1971

Inventor(s) John P. Chupp

It is certified that error appears in the above-identified patent and that said Letters Patent are hereby corrected as shown below:

Column 2, lines 7-12, delete the first structural formula appearing at this point and substitute therefor

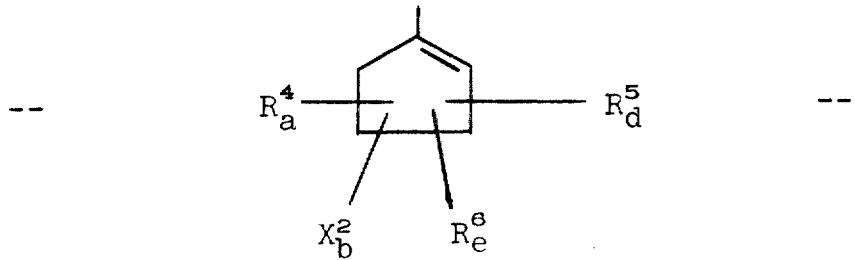

Column 2, lines 13-18, delete the first structural formula appearing at this point and substitute therefor

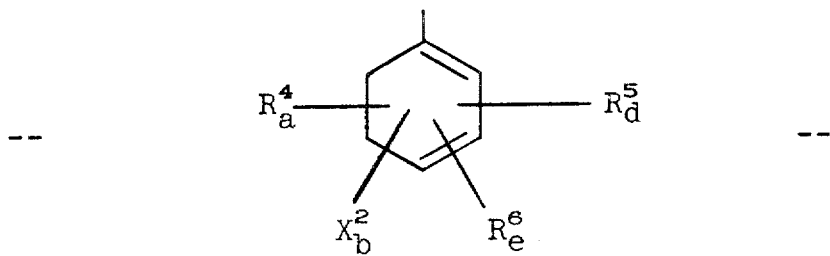

Column 2, lines 19-26, delete the first structural formula appearing at this point and substitute therefor

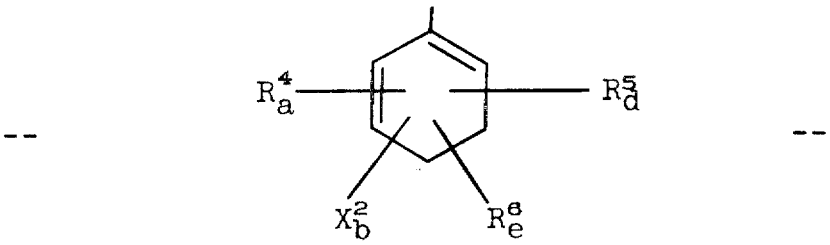

UNITED STATES PATENT OFFICE
CERTIFICATE OF CORRECTION

PAGE 2

Patent No. 3,586,496                     Dated June 22, 1971

Inventor(s) John P. Chupp

It is certified that error appears in the above-identified patent and that said Letters Patent are hereby corrected as shown below:

Column 4, line 20, delete "alkyl, alkenoxyalkyl, alkoxyalkoxyalkyl, alkenoxyalkyl-" and substitute therefor -- alkyl, alkenoxyalkyl, alkoxyalkoxyalkyl, alkenoxyalkoxy- --.

Column 5, lines 38-44, delete the first structural formula appearing at this point and substitute therefor

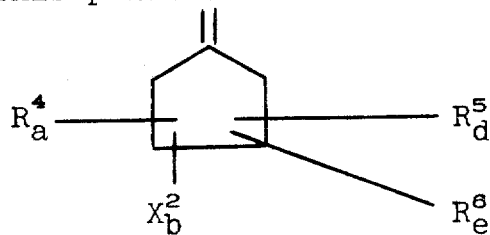

Column 14, line 47, after "140", delete "N-(1,3-cyclohexadien-1-yl) N-(methyl) alpha-chloroacetamid" and substitute therefor -- N-(1,3-cyclohexadien-1-yl) N-(methyl) alpha-chloroacetamide --.

Column 14, line 54, after "146", delete "N-/2,6-di(tert-bntyl)-1-cyclohexen-1-yl/ N-(isopropyl) alpha-" and substitute therefor -- N-/2,6-di(tert-butyl)-1-cyclohexen-1-yl/ N-(isopropyl) alpha- --.

Column 14, line 61, after "151", delete "N-/2,6-di(tert-bntyl)-1,3-cyclohexadien-1-yl/-N-methyl alpha-" and substitute therefor -- N-/2,6-di(tert-butyl)-1,3-cyclohexadien-1-yl/-N-methyl alpha- --

Column 14, line 65, after "154", delete "N-(6-tert-bntyl-

UNITED STATES PATENT OFFICE
CERTIFICATE OF CORRECTION

Patent No. 3,586,496  Dated June 22, 1971

Inventor(s) John P. Chupp

It is certified that error appears in the above-identified patent and that said Letters Patent are hereby corrected as shown below:

1,4-cyclohexadien-1-yl)-N-2,4-dichlorobutyl" and substitute therefor -- N-(6-tert-butyl-1,4-cyclohexadien-1-yl)-N-2,4-dichlorobutyl --.

Column 15, line 6, after "164", delete "N-(7-tert-bntyl-1-cyclohepten-1-yl) N-(isopropyl) alpha-" and substitute therefor -- N-(7-tert-butyl-1-cyclohepten-1-yl) N-(isopropyl) alpha- --.

Column 17 in Table I, delete the sixth-named compound, i.e., "N-(1-cyclohexen-1-ly)-N-allyl-alpha-chloroacetamide" and substitute therefor -- N-(1-cyclohexen-1-yl)-N-allyl-alpha-chloroacetamide --.

Column 23, line 15, delete "dichloroebnzoic" and substitute therefor -- dichlorobenzoic --.

Column 25, lines 17-22, delete the first formula occurring at this point and substitute therefor -- 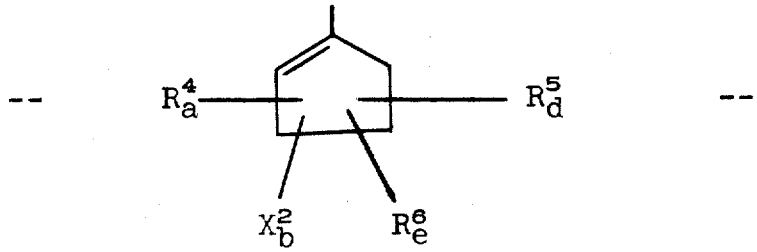 --

Column 25, lines 28-33, delete the second structural formula appearing at this point and substitute therefor

UNITED STATES PATENT OFFICE
CERTIFICATE OF CORRECTION

Patent No. 3,586,496  Dated June 22, 1971

Inventor(s) John P. Chupp

It is certified that error appears in the above-identified patent and that said Letters Patent are hereby corrected as shown below:

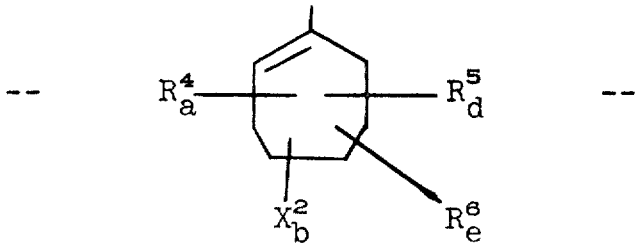

Column 25, line 67, delete "cyclohexen-1-yl) N-ethylacetamide" and substitute therefor -- alpha-chloroacetamide --.

Column 26, line 22, immediately before "2", insert -- ( --.
Column 26, line 27, immediately after "poxyethyl", insert -- ) --.
Column 26, line 28, immediately before "2", insert -- ( --.
Column 26, line 33, delete "propyl" and substitute therefor -- ethyl --.
Column 26, line 34, delete "propoxyethyl" and substitute therefor -- ethoxyethyl --.

Column 27, lines 34-40, delete both structural formulae and substitute therefor

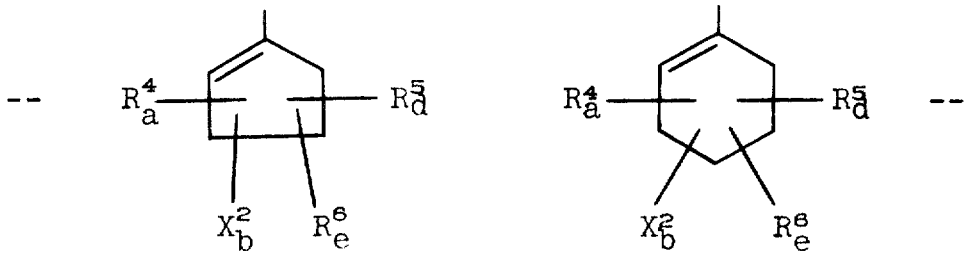

Signed and sealed this 15th day of February 1972.

(SEAL)
Attest:

EDWARD M. FLETCHER, JR.
Attesting Officer

ROBERT GOTTSCHALK
Commissioner of Patents